(12) United States Patent
Yamamoto

(10) Patent No.: US 9,592,786 B2
(45) Date of Patent: Mar. 14, 2017

(54) CLIP, CURTAIN AIRBAG MOUNTING STRUCTURE AND PILLAR GARNISH MOUNTING STRUCTURE

(71) Applicant: TOYOTA JIDOSHA KABUSHIKI KAISHA, Toyota-shi, Aichi-ken (JP)

(72) Inventor: Kazuhito Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/895,995

(22) PCT Filed: Jun. 4, 2014

(86) PCT No.: PCT/IB2014/000942
§ 371 (c)(1),
(2) Date: Dec. 4, 2015

(87) PCT Pub. No.: WO2014/195784
PCT Pub. Date: Dec. 11, 2014

(65) Prior Publication Data
US 2016/0121836 A1 May 5, 2016

(30) Foreign Application Priority Data

Jun. 6, 2013 (JP) .................................. 2013-119738
Nov. 25, 2013 (JP) .................................. 2013-242700

(51) Int. Cl.
*B60R 21/16* (2006.01)
*B60R 21/213* (2011.01)
(Continued)

(52) U.S. Cl.
CPC .......... *B60R 21/213* (2013.01); *B60R 13/025* (2013.01); *B60R 13/0206* (2013.01);
(Continued)

(58) Field of Classification Search
CPC .... F16B 21/065; F16B 21/086; F16B 21/125; F16B 21/12; F16B 19/1081; B60R 21/20; B60R 21/213
(Continued)

(56) References Cited

U.S. PATENT DOCUMENTS 6,616,479 B1 * 9/2003 Jones .................. F16B 19/1081
411/48
8,043,038 B2 * 10/2011 Sano .................. F16B 19/1081
24/297
(Continued)

FOREIGN PATENT DOCUMENTS

CN 102362079 A 2/2012
CN 103079892 A 5/2013
(Continued)

OTHER PUBLICATIONS

Apr. 21, 2015 Statement of Relevance—Partial Translation of Office Action issued in Japanese Patent Application No. 2013-119738.

*Primary Examiner* — Toan To
(74) *Attorney, Agent, or Firm* — Oliff PLC

(57) ABSTRACT

A clip includes a clip main body. The clip main body has a pair of locking pawls which are deformable in a direction in which they approach each other. The pair of the locking pawls have internal side faces opposed to each other. A projection/recess is provided on at least part of the internal side face of the pair of the locking pawls. A projection portion of the projection/recess of the locking pawl on one side is opposed to a recess portion of the projection/recess of the locking pawl on the other side.

14 Claims, 25 Drawing Sheets

(51) Int. Cl.

| | | |
|---|---|---|
| *F16B 19/10* | (2006.01) | |
| *B60R 13/02* | (2006.01) | |
| *B60R 21/216* | (2011.01) | |
| *B60R 21/217* | (2011.01) | |
| *B60R 21/232* | (2011.01) | |
| *F16B 41/00* | (2006.01) | |

(52) U.S. Cl.
CPC .......... *B60R 21/216* (2013.01); *B60R 21/217* (2013.01); *B60R 21/232* (2013.01); *F16B 19/1081* (2013.01); *F16B 41/002* (2013.01)

(58) Field of Classification Search
USPC ......... 280/728.2; 24/297, 370; 411/508, 913
See application file for complete search history.

(56) References Cited

U.S. PATENT DOCUMENTS

| | | | | |
|---|---|---|---|---|
| 8,677,573 | B2* | 3/2014 | Lee | B60R 13/0206 |
| | | | | 24/289 |
| 8,961,092 | B2* | 2/2015 | De Jong | B60R 13/0206 |
| | | | | 24/295 |
| 9,115,743 | B2* | 8/2015 | Yamamoto | F16B 21/065 |
| 9,360,033 | B2* | 6/2016 | Gromes | F16B 19/1081 |
| 2004/0136812 | A1* | 7/2004 | Kawai | B60R 21/213 |
| | | | | 411/508 |
| 2007/0075531 | A1 | 4/2007 | Tsuge | |
| 2008/0014045 | A1* | 1/2008 | Kawai | F16B 19/1081 |
| | | | | 411/45 |
| 2008/0193250 | A1 | 8/2008 | Boubtane | |
| 2010/0158632 | A1 | 6/2010 | Sano | |
| 2010/0172714 | A1 | 7/2010 | Sano | |
| 2011/0164946 | A1 | 7/2011 | Busch et al. | |
| 2012/0291240 | A1 | 11/2012 | Suzuki | |
| 2013/0168515 | A1 | 7/2013 | Yamamoto | |
| 2013/0183089 | A1* | 7/2013 | Podsadny | B60R 13/0206 |
| | | | | 403/376 |

FOREIGN PATENT DOCUMENTS

| | | |
|---|---|---|
| FR | 2882114 A1 | 8/2006 |
| JP | H07-41029 U | 7/1995 |
| JP | 2000-220618 A | 8/2000 |
| JP | 2005-219524 A | 8/2005 |
| JP | 2006-161890 A | 6/2006 |
| JP | 2007-098986 A | 4/2007 |
| JP | 2008-020006 A | 1/2008 |
| JP | 2008-259363 A | 10/2008 |
| JP | 2010-060017 A | 3/2010 |
| JP | 2010-144830 A | 7/2010 |
| JP | 2010-144900 A | 7/2010 |
| JP | 2011-133014 A | 7/2011 |
| JP | 2013-180725 A | 9/2013 |
| WO | 2010/108614 A1 | 9/2010 |

* cited by examiner

F I G . 9
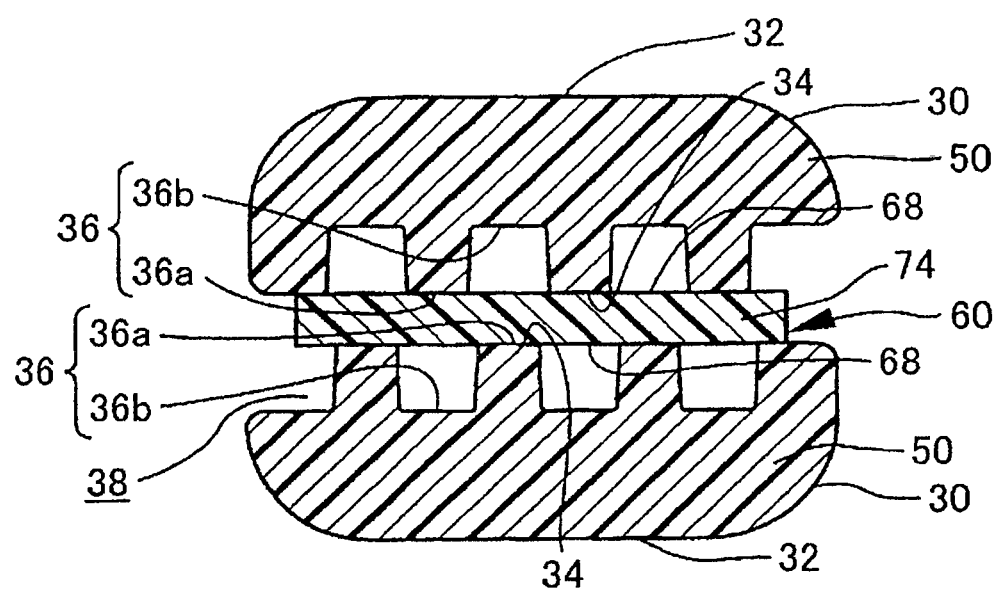

CLIP, CURTAIN AIRBAG MOUNTING STRUCTURE AND PILLAR GARNISH MOUNTING STRUCTURE

BACKGROUND OF THE INVENTION

1. Field of the Invention

The present invention relates to a clip and a curtain airbag mounting structure and a pillar garnish mounting structure using the same. Hereinafter, the curtain airbag is also referred to as "CSA". The CSA is an abbreviation of the curtain shield airbag.

2. Description of Related Art

Japanese Patent Application Publication No. 2010-144830 (JP 2010-144830 A) has disclosed a clip of lock pin type for mounting the CSA on a vehicle body, for example, an inner panel of a front pillar (referred to as A pillar also). This clip has a clip main body and a lock pin. The clip main body includes a seating portion, a single leg portion which extends in a direction in which they leave the seating portion and is to be inserted into a clip mounting hole in the body, and a pair of locking pawls which are arranged in an opening portion provided on both sides of the leg portion. The pair of the locking pawls extend toward the seating portion from a connecting portion with the leg portion which is located far from the seating portion. The external side face of the locking pawl is inclined along a direction in which they approach a clip central axial line as it leaves the seating portion far.

At the time of inflation of the CSA, a tensile load which pulls the clip obliquely is applied by the CSA. Of this oblique tensile load, a load component in the clip axis direction is borne by the clip axial direction shearing strength of the locking pawl and a load component in a direction perpendicular to the clip axial direction is borne by the shearing strength in a direction perpendicular to the clip axial direction of the leg portion.

However, the clip as disclosed in JP 2010-144830 A in which the locking pawl extends toward the seating portion has a following problem.

For the leg portion and the locking pawl to be able to pass through the clip mounting hole in the body at the time of clip mounting, a projection amount of the locking pawl from an external side face of the leg portion cannot be set large. Thus, a locking allowance of the locking pawl to a clip mounting hole edge portion after passing the clip mounting hole cannot be secured to be large enough. For the reason, if it is requested to increase the clip axial direction strength of the locking pawl, it is sometimes difficult to satisfy such a demand. Further, because the looking pawls are provided in an opening portion of the leg portion and the width of the locking pawl is smaller than the width of the leg portion, if there is a demand for increasing the clip axial direction strength of the locking pawl further, it is sometimes difficult to satisfy such a demand. Further, if the width of the locking pawl is made too large, it comes that the width of the leg portion becomes small, which may lead to breaking of the leg portion.

Further, because an opening portion in which the locking pawl is to be arranged is provided on both sides of the leg portion, the sectional area in a direction at right angle to the axis of the leg portion is smaller compared to a sectional area when the inside of the external shape of the leg portion is substantially filled and the shearing strength in the direction at right angle of the leg portion is small. Thus, even if it is intended to increase the strength in the direction at right angle to the axis of the leg portion further, such a demand sometimes cannot be satisfied.

Additionally, Japanese Patent Application Publication No. 2007-098986 (JP 2007-098986 A) has disclosed a tether clip in which a pillar garnish that accommodates the CSA is mounted on an A pillar and scattering of the pillar garnish at the time of inflation of a CSA is prevented.

FIGS. 22 to 25 show a comparative example clip (hereinafter also referred to as comparative clip) 111 which was considered on the halfway of development of the present invention. As shown in FIGS. 22 to 25, the comparative clip 111 containing the clip according to Japanese Patent Application Publication No. 2013-180725 (JP 2013-180725 A) has a pair of locking pawls 131 opposed to each other and opposing internal side faces 135 of the pair of the locking pawls 131 are flat.

However, when the pair of the locking pawls 131 are mounted in the body clip mounting hole or removed from the clip mounting hole at a service time, the comparative clip 111 receives a restriction due to interference between the opposing internal side faces 135 and a restriction due to insertion into the clip mounting hole, so that a following problem occurs.

(a) Because no sufficient thickness in a deflection direction of the locking pawl 131 can be secured, stiffness in the deflection direction of the locking pawl 131 sometimes cannot be secured. In this case, if a load in the clip axial direction is applied to the locking pawl 131 at the time of inflation of the CSA, the locking pawl 131 is deformed as shown with two-dot dash line of FIG. 25, so that there is a fear that the clip 111 may slip out of the clip mounting hole 193 in the body 191 so that scattering of a pillar garnish cannot be prevented. (b) If the thickness of the locking pawl 131 is increased to secure stiffness in the deflection direction of the locking pawl 131, engagement allowance of an edge portion of the clip mounting hole with a pawl decreases. (c) If the thickness of the locking pawl 131 is increased to secure stiffness and the engagement allowance of the locking pawl 131 is also secured, interference occurs between the opposing internal side faces 135 of the pair of the locking pawls 131 upon insertion of a tether clip 111 into the clip mounting hole 193 or removal thereof. As a result, not only a trouble occurs in insertion into the clip mounting hole, but also sink marks occur at molding time due to the increased thickness.

SUMMARY OF THE INVENTION

The present invention provides a clip whose strength has been improved and a CSA mounting structure using the same.

The present invention provides a clip which can solve at least one of the above-described problems: (a) difficulty of securing stiffness, (b) decreased engagement allowance, and (c) interference between opposing internal side faces of locking pawls, and a pillar garnish mounting structure using the same.

A first aspect of the present invention relates to a clip. The clip includes a clip main body. The clip main body includes a pair of locking pawls which are deformable in a direction in which they approach each other. The pair of the locking pawls have internal side faces opposed to each other. A projection/recess is provided on at least part of the internal side faces of the pair of the locking pawls. A projection portion of the projection/recess of the locking pawl on one side is opposed to a recess portion of the projection/recess of the locking pawl on the other side.

According to the clip of the above-described aspect, because the projection/recess is provided on the opposing internal side faces of the pair of the locking pawls, the deformable amount of the pair of the locking pawls in the direction in which they approach each other is increased compared to a case where no projection/recess is provided. As a result, with the insertion of the pair of the locking pawls into the clip mounting hole enabled, the engagement allowance between the clip and the edge portion of the clip mounting hole of the pair of the locking pawls in the locking pawl deformation direction can be increased and at the same time, bending strength of the locking pawl can be increased. As a result, chipping, crushing deformation and bending deformation of the locking pawl in the clip axial direction can be inhibited thereby increasing the holding performance of the clip.

In the above-described aspect, the clip main body may have a seating portion. The pair of the locking pawls may include shank portions which are connected to the seating portion and extend in a direction in which they leave the seating portion, and pawl portions which are connected to the shank portions and extend in a direction in which they leave the seating portion. Protrusion portions which project in a direction in which they leave each other may be formed on the pawl portions of the pair of the locking pawls.

According to the clip of the above-described aspect, the locking pawl including the shank portions and the pawl portions extend in the direction in which it leaves the seating portion and the protrusion portions which project in the direction in which they leave each other are formed on the pawl portions of the pair of the locking pawls. Thus, compared to a clip whose distance from the clip central axial line decreases as the external side face of the locking pawl leaves the seating portion, the projecting portion can secure a large engagement allowance with the edge portion of the clip mounting hole and at the same time, have a large shearing sectional area which passes the internal face of the clip mounting hole and runs along the clip central axial line. As a result, when a load is applied to the protrusion portion from the clip mounting hole edge portion, the protrusion portion can withstand the load with a sufficient shearing strength.

In the above-described aspect, the protrusion portion may be formed on the pawl portion over the entire width of the locking pawl or substantially the entire width thereof. Here, it is assumed that "substantially entire width" includes a range of about ±20% the "entire width" (hereinafter, the same)

According to the clip of the above-described aspect, because the protrusion portion is formed on the pawl portion over the entire width or substantially entire width of the locking pawl, compared to a clip in which the locking pawl (corresponding to the pawl portion of the present invention) is formed only on part in the width direction of the leg portion (corresponding to the locking pawl of the present invention), the shearing strengths of the locking pawl and the pawl portion in the clip axial direction and in a direction perpendicular to the clip axial direction increase.

In the above-described aspect, the clip may further include a lock pin. The lock pin may have side faces. A space may be provided between the internal side faces of the pair of the locking pawls and the lock pin may be insertable into the space. When the lock pin is inserted into the space, the front end face of the projection portion on the internal side face of the pair of the locking pawls may contact the side face of the lock pin to inhibit the pair of the locking pawls from being deformed in a direction in which they approach each other.

According to the clip of the above-described aspect, when the lock pin is inserted into the space, deformation of the pair of the locking pawls in the direction in which they approach each other is inhibited so that the lock pin can be mounted on the edge portion of the clip mounting hole.

In the above-described aspect, the projection/recess may be formed on at least part of the shank portion and at least part of the pawl portion of the pair of the locking pawls. The projection/recess portion having a projection portion which rushes in a recess portion formed in the shank portion of the locking pawl, when the lock pin is inserted into the space, may be formed at a portion of the lock pin corresponding to the shank portion of the locking pawl.

According to the clip of the above-described aspect, when the lock pin is inserted into the space, the projection portion of the projection/recess portion of the lock pin rushes in the recess portion formed in the shank portion of the locking pawl. Thus, the recess portion of the shank portion are substantially filled, so that even if the clip receives shearing force in a direction at right angle to the axis from the clip mounting hole edge portion, deformation of the clip is inhibited thereby increasing the holding performance of the clip.

In the above-described aspect, the lock pin may have a pin pawl portion. The clip main body may have a temporary holding hole which receives the pin pawl portion into a wall of a lock pin insertion hole to hold the lock pin temporarily and a final holding hole which receives the pin pawl portion to hold the lock pin finally. The final holding hole may be provided on a deeper side of the lock pin insertion hole with respect to the temporary holding hole. When the pin pawl portion engages with the temporary holding hole, the pair of the locking pawls may be deformable in the direction in which they approach each other. When the pin pawl portion engages with the final holding hole, the pair of the locking pawls may be inhibited from being deformed in the direction in which they approach each other.

According to the above-described aspect, because the clip mounting procedure can be performed with the lock pin held in the clip main body temporarily, the operating efficiency is improved.

In the above-described aspect, the clip may further have a lock pin. The projection/recess may extend in the clip axial direction.

According to the above-described aspect, resistance when the lock pin is inserted into the clip can be reduced compared to a case where the projection/recess extend in other directions than the clip axial direction. As a result, the operating efficiency is improved.

A second aspect of the present invention relates to a curtain airbag mounting structure. The CSA mounting structure is a structure formed by mounting the CSA on a vehicle body using the clip of the above aspect.

According to the CSA mounting structure of the above-described aspect, because the CSA is mounted on the vehicle body using the clip having a large strength, it is possible to provide a CSA mounting structure whose CSA holding strength is improved.

In the above-described first aspect, the clip main body may include a seating portion and shank portions which extend in a direction in which they leave the seating portion. The pair of the locking pawls may extend from a connecting portion with the shank portion to the seating portion side and terminate at a free end. In the meantime, this aspect can be applied to a clip of type in which the locking pawl extends from the connecting portion with the shank portion to the seating portion side and terminate at a free end. The clip of this type includes a tether clip and a CSA mounting clip.

According to the clips of the above-described aspects, at least one of the following effects (i), (ii), (iii) can be obtained. However, it is permissible that all the effects (i), (ii), (iii) cannot be obtained at the same time. (i) Because the projection/recess is provided on the internal side face of the locking pawl, stiffness in the deflection direction of the locking pawl can be secured. As a result, the above-described problem (a) can be solved. (ii) Because the projection/recess is provided inside the locking pawl, stiffness of the locking pawl can be secured without reduction of the deflection amount which leads to interference of opposing faces, thereby maintaining the engagement allowance for the locking pawl. As a result, the above-described problem (b) can be solved. (iii) Even if stiffness of the locking pawl is secured, interference between the opposing internal side faces of the pair of the locking pawls can be avoided without forming the locking pawl in a large thickness because the projection/recess is provided. As a result, the assembly performance of the clip and the removal easiness of the clip at a service time can be improved. Further, because stiffness in the deflection direction of the locking pawl can be secured, removal resistance of the clip when a load is applied to the locking pawl in the clip axial direction at the time of inflation of the CSA can be improved. Further, occurrence of sink marks at molding time can be inhibited because the locking pawl does not need to be formed in a large thickness. These matters can solve the above problem (c).

In the above-described aspect, each of the pair of the locking pawls may projects in a direction in which it leaves the clip central axial line and include an engaging portion which is capable of engaging with the peripheral portion of the clip mounting hole in a clip axial direction when the clip is mounted on the clip mounting hole and an engagement releasing portion for disengaging the clip which is provided at a front end of the locking pawl on a side near the seating portion and extends in the direction in which it leaves the clip central axial line.

According to the clip of the above-described aspect, a following effect can be obtained. If the removal of the clip at a service time is facilitated by providing the engagement releasing portion, there is no other way but providing the engagement releasing portion at the front end of the locking pawl on a side near the seating portion. In that case, the length of the locking pawl is increased by an amount corresponding to the provision of the engagement releasing portion, so that the opposing internal side faces become more likely to be interfered by each other when the locking pawls fall down and are deformed at the service time. However, the interference between the opposing internal side faces of the pair of the locking pawls is avoided by the projection/recess.

In the above-described aspect, the projection/recess may be formed on the opposing internal side faces of the engagement releasing portion provided on the locking pawl.

In the above-described aspect, the projection/recess may be formed on both the internal side face of the locking pawl and the internal face of the shank portion from the front end of the locking pawl on a side near the seating portion up to a front end of the shank portion on a side far from the seating portion.

According to the clip of the above-described aspect, bending strength in the deflection direction of the locking pawl is increased. As a result, when a removal load is applied to the clip in the axial direction, reduction of the removal load resistance due to deflection of the engaging portion accompanied by deformation of the root portion of the locking pawl can be prevented.

In the above-described aspect, the clip is a tether clip.

According to the clip of the above-described aspect, the same effect as or similar effect to the clip according to any one of the above-described aspects can be obtained in the tether clip also. That is, stiffness in the deflection direction of the locking pawls of the tether clip can be secured, an engagement allowance of the locking pawl can be secured and upon assembly of the tether clip and removal of the tether clip at a service time, interference between the opposing internal side faces of the pair of the locking pawls can be avoided. As a result, assembly performance of the tether clip to the body, removal easiness of the tether clip at a service time and removal resistance of the tether clip at the time of inflation of the CSA and the like can be improved.

According to a third aspect of the present invention, the pillar garnish mounting structure is constructed by mounting a pillar garnish on a body using the clip of the above-described aspect.

According to the pillar garnish mounting structure of the above-described aspect, the same effect as or similar effect to the effect of the above-described tether clip can be obtained. As a result, the assembly performance of the pillar garnish to the body is improved, the removal performance of the pillar garnish from the body at a service time is improved and scattering of the pillar garnish at the time of inflation of the CSA is inhibited more securely.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a sectional view taken along the line IX-IX of the clip of FIG. 4;

DETAILED DESCRIPTION OF EMBODIMENTS

Figure 10:
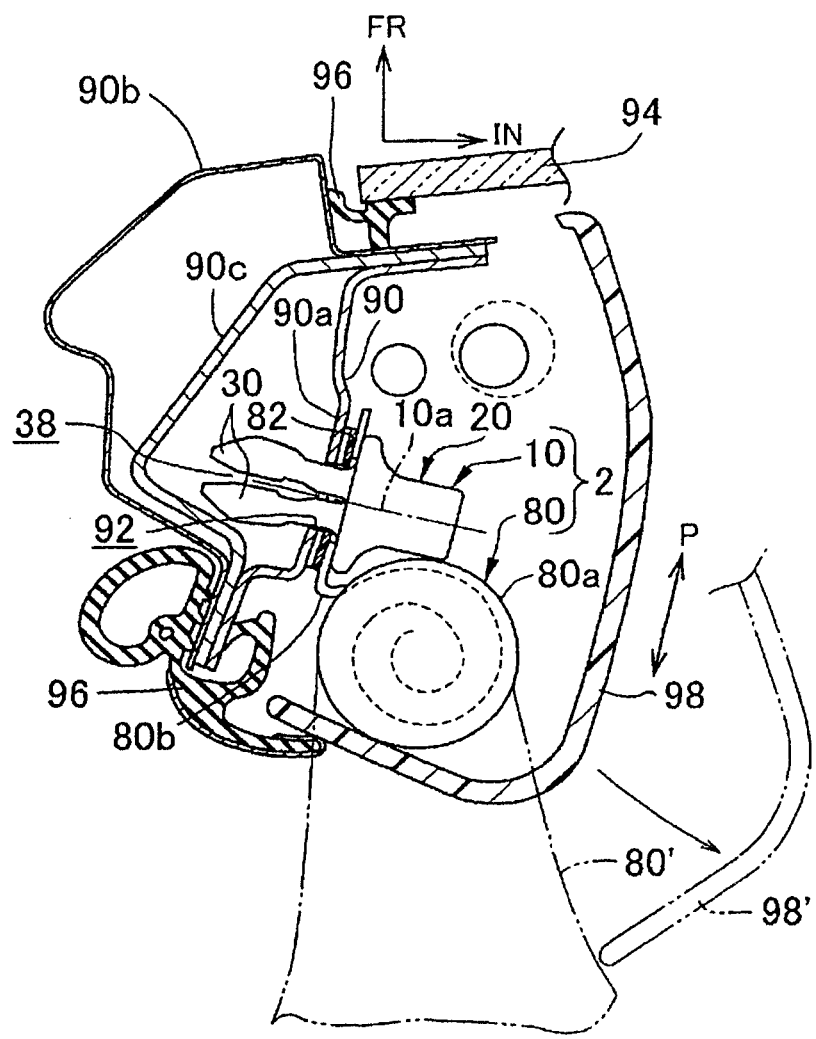
FIG. 10 is a sectional view of a CSA mounting structure according to the first embodiment of the present invention.
Figure 11:
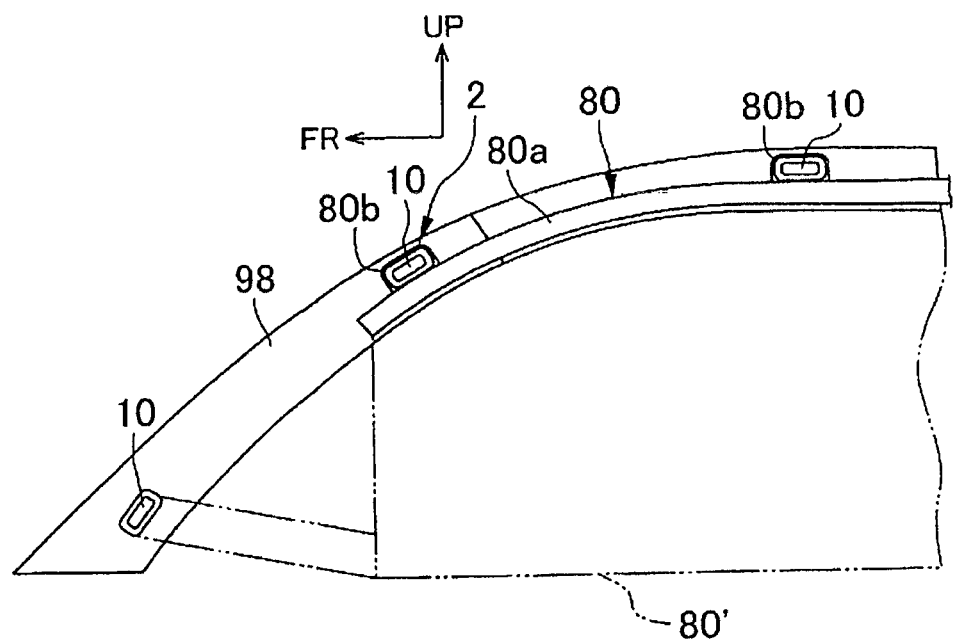
FIG. 11 is an arrangement diagram of the clip of the CSA structure of FIG. 10.
Figure 12:
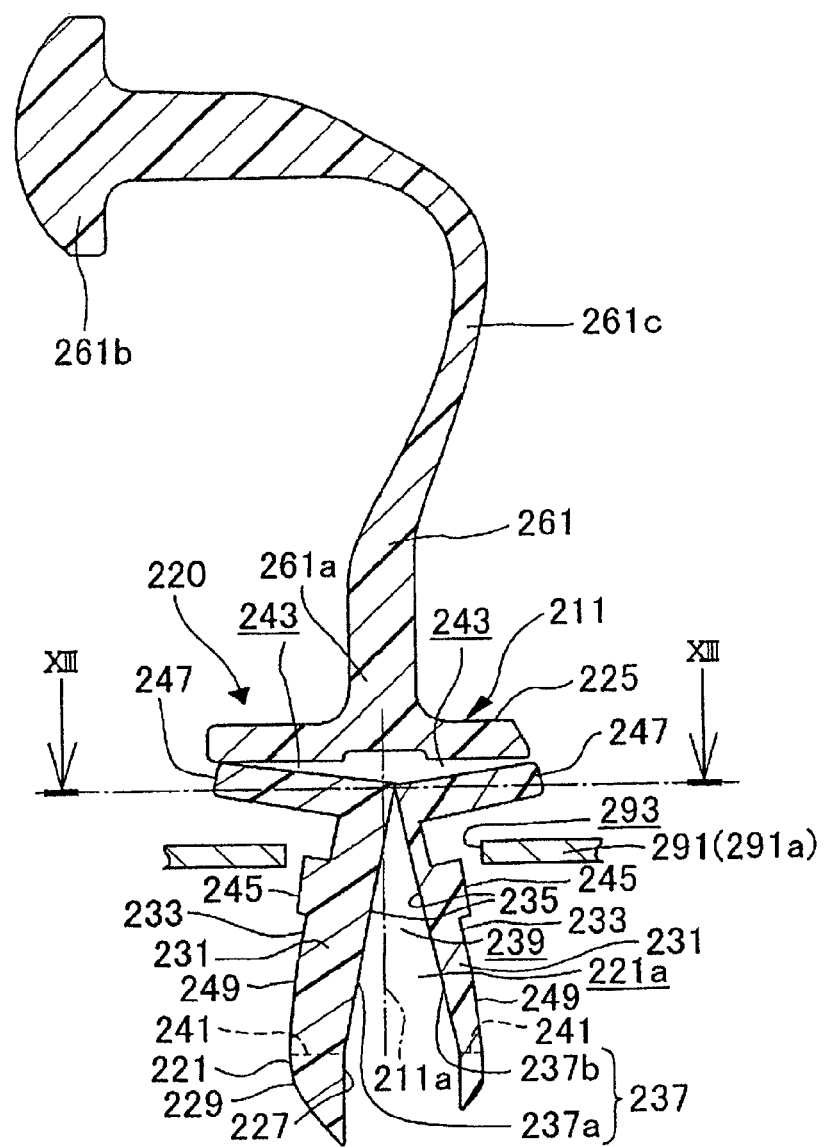
FIG. 12 is an end face diagram of the section of a clip according to a second embodiment of the present invention at the time of insertion into the clip mounting hole.
Figure 13:
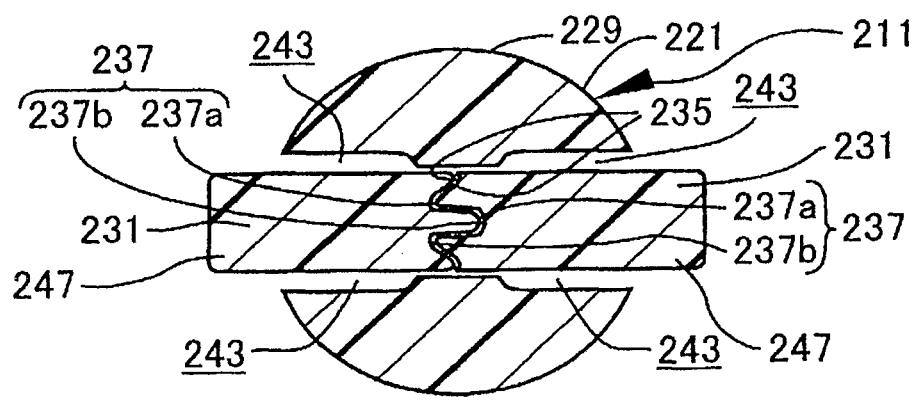
FIG. 13 is a sectional view taken along the line XIII-XIII of the clip of FIG. 12.

A clip 10 according to a first embodiment of the present invention and a CSA mounting structure 2 having the clip 10 as its main component will be described with reference to FIGS. 1 to 11. FIGS. 1 to 9 show the clip 10 and FIGS. 10 and 11 show the CSA mounting structure 2. In the figures, P indicates a direction perpendicular to the longitudinal direction of the CSA. In addition, in FIGS. 10, 11, FR indicates forward of a vehicle, IN indicates inward of the right-left direction of the vehicle and UP indicates upward.

Figure 1:
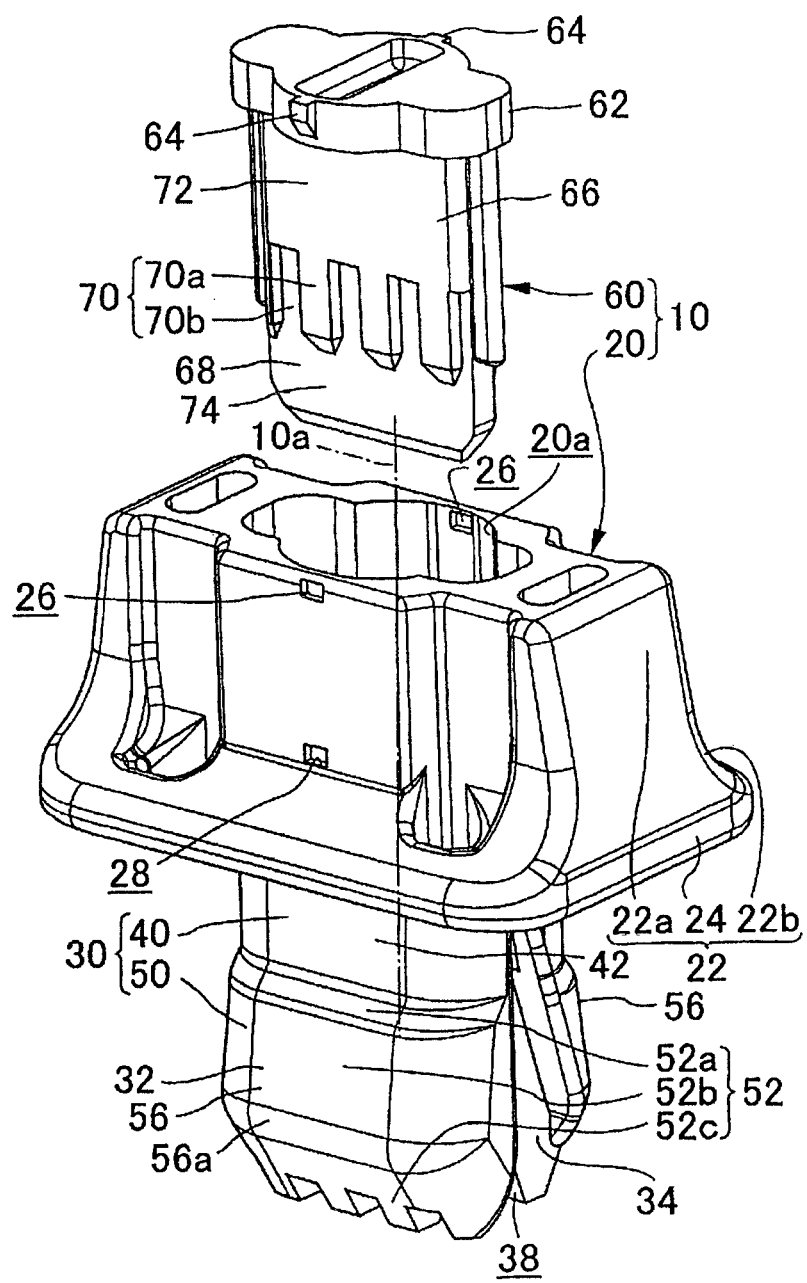
FIG. 1 is a perspective view of a clip according to a first embodiment of the present invention just before insertion of the lock pin into the clip main body.

As shown in FIG. 1, the clip 10 has a clip main body 20. The clip 10 may have a lock pin 60 which is separate from the clip main body 20. The clip main body 20 is formed of resin material having flexibility. The resin material is, for example, polyhexamethylene adipamide. However, any other resin materials may be used as long as it is a resin material having flexibility and a necessary strength. If a lock pin 60 is provided, the lock pin 60 is formed of resin material. The resin material for the lock pin 60 may be flexible or not. If the lock pin 60 is formed of resin material having flexibility, the lock pin 60 may be formed of the same resin material as the clip main body 20.

As shown in FIGS. 1 to 7, the clip main body 20 includes a head portion 22 and a pair of locking pawls 30. The head portion 22 contains a seating portion 24. The external shape of the section perpendicular to the dip central axial line 10a of the head portion 22 and the pair of the locking pawls 30 is a rectangular one whose corners are rounded. As shown in FIG. 10, in a state in which a CSA 80 is mounted on a body 90 through the clip 10, the extending direction of the longer side of the rectangular external shape of the head portion 22 and the pair of the locking pawl 30 and the extending direction of a CSA main body portion 80a are parallel to each other.

Figure 2:
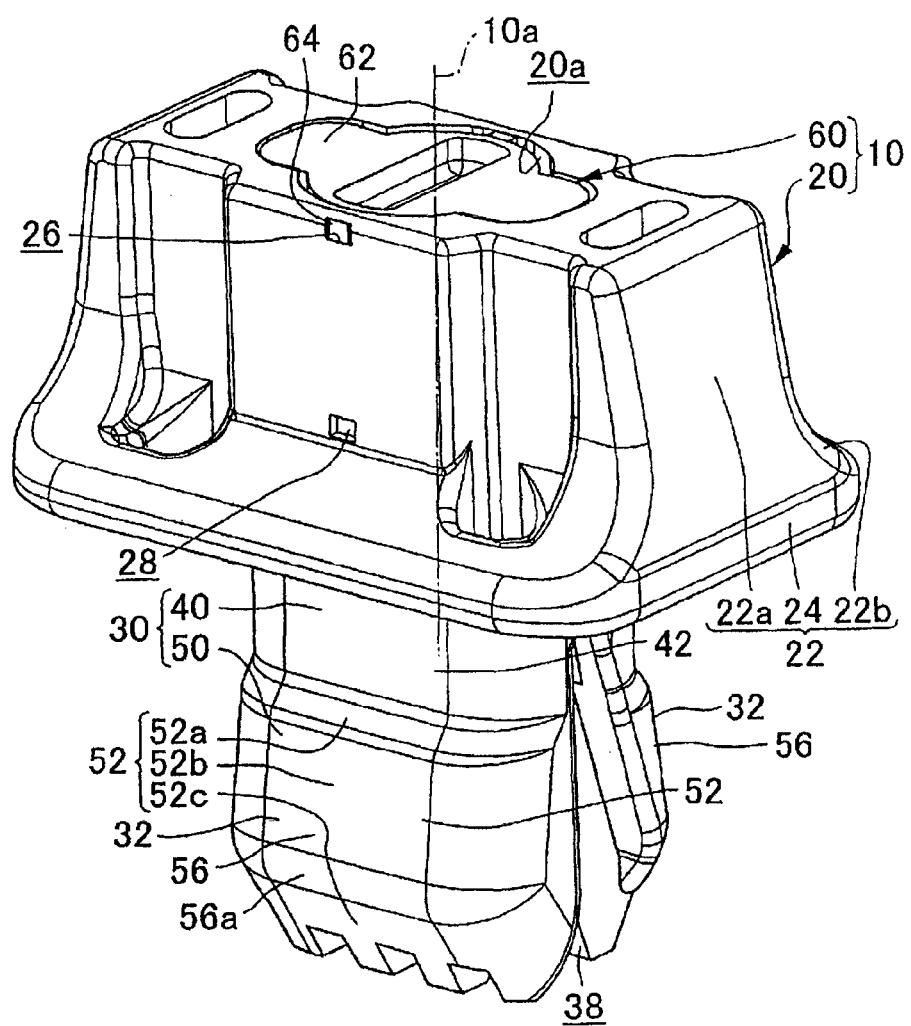
FIG. 2 is a perspective view of the clip of FIG. 1 when the lock pin is locked in a temporary holding hole.
Figure 3:
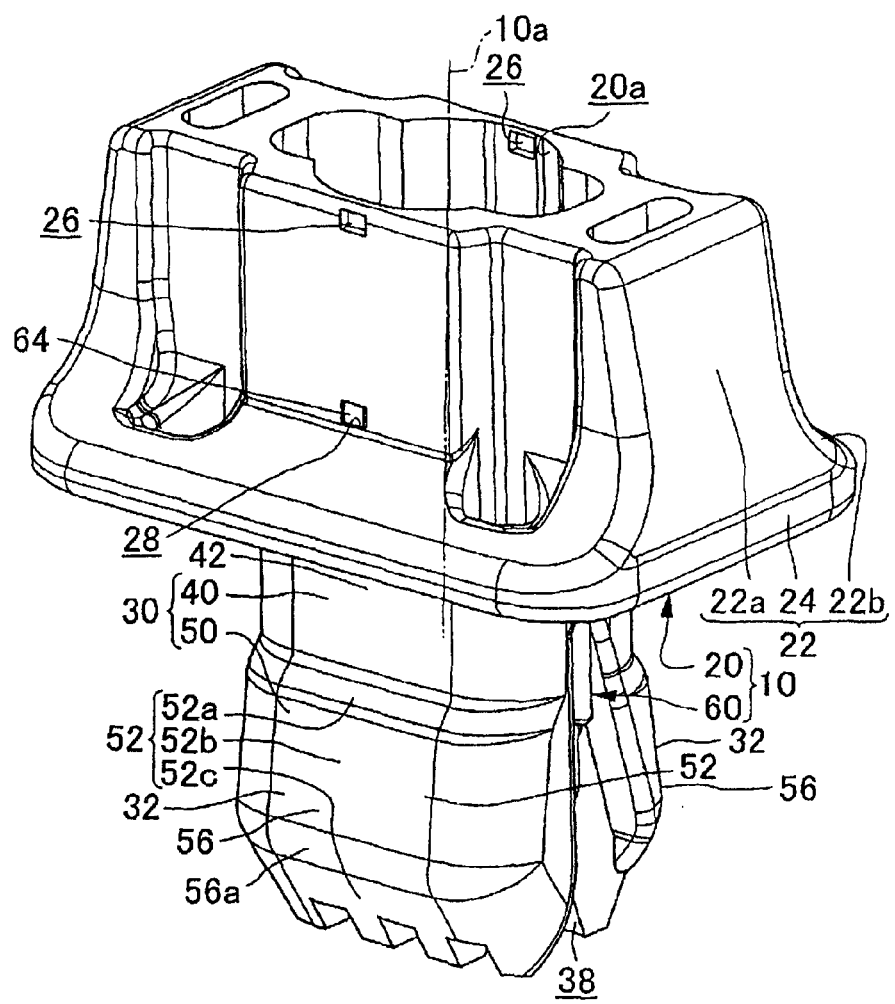
FIG. 3 is a perspective view of the clip of FIG. 1 when the lock pin is locked in a final holding hole.
Figure 4:
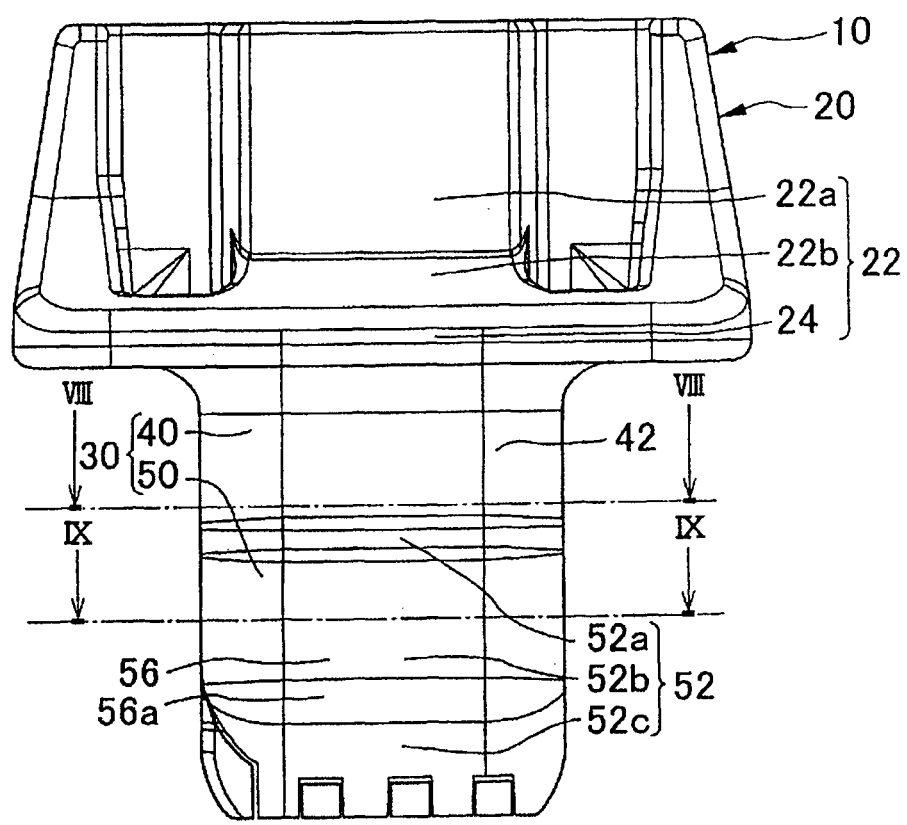
FIG. 4 is a front view of the clip of FIG. 3.
Figure 5:
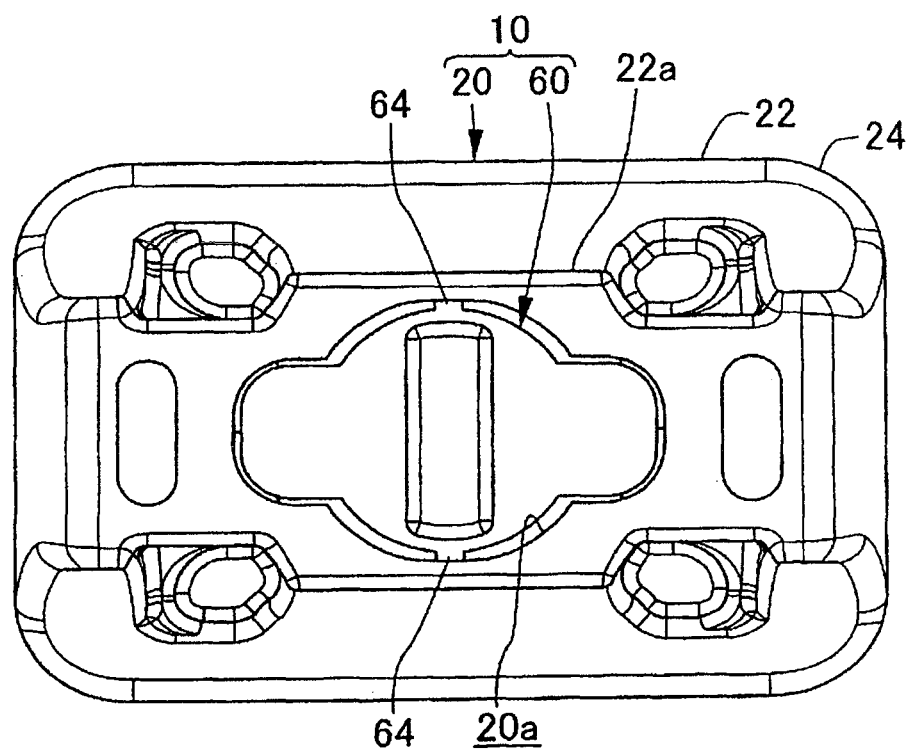
FIG. 5 is a plan view of the clip of FIG. 4.

As shown in FIGS. 1 and 2, if the lock pin 60 is provided, the clip main body 20 has a lock pin insertion hole 20a extending in a direction along the clip central axial line 10a at a central portion of the head portion. The central axial line of the lock pin insertion hole 20a is corresponding to the clip central axial line 10a. The lock pin insertion hole 20a passes through the head portion 22 and communicates with a space 38 which exists between the pair of the locking pawls 30. Part of the lock pin 60 is capable of being inserted into the space 38 through the lock pin insertion hole 20a. That is, the lock pin 60 is capable of being inserted along the clip central axial line 10a.

Figure 7:
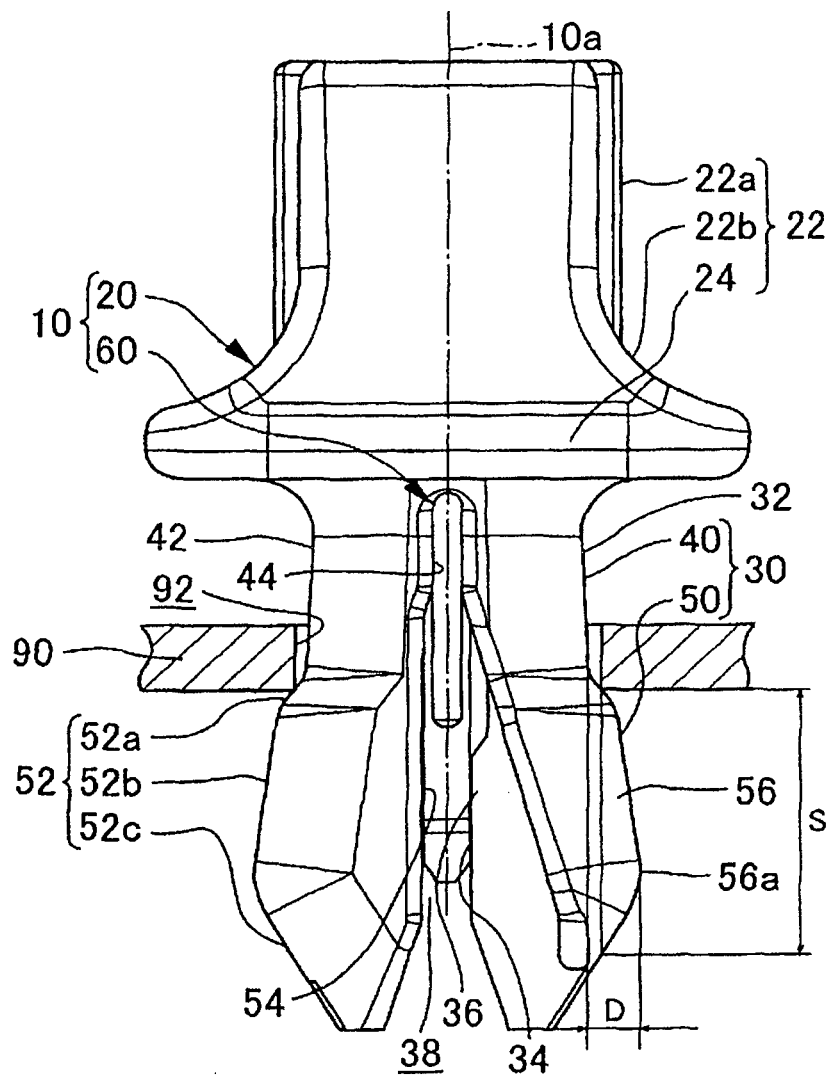
FIG. 7 is a side view of the clip in a state in which the clip of FIG. 4 is mounted on the clip mounting hole in the body.

The pair of the locking pawls 30 are coupled with the head portion 22 at a head portion side end portion of the locking pawl 30 and extend in a direction in which they leave the head portion 22 while it terminates at a free end portion on a side far from the head portion 22 of the locking pawl 30. The pair of the locking pawls 30 are separated from each other in a direction perpendicular to the clip axial direction over the entire length in the clip axial direction (direction in which the clip central axial line 10a extends) of the locking pawl 30 or except the head portion side end portion of the locking pawl 30. The space 38 is located between the pair of the locking pawls 30 separated from each other. As shown in FIG. 7, the space 38 extends in a direction in which it leaves the seating portion 24 along the clip axial direction and is open at an end portion opposite to the seating portion 24 of the space 38. The space 38 extends in a direction which is perpendicular to the clip axial direction and in which the longer side of the rectangular external shape of the pair of the locking pawls 30 extends or over the entire length in the direction in which the longer side of the rectangular external shape of the pair of the locking pawls 30 extends and is open at both ends of the space 38.

Because the clip main body 20 is formed of resin material having flexibility, the locking pawls 30 is elastically deformable in a direction in which the pair of the locking pawls 30 approach each other around the head portion side end portion of each locking pawl 30, that is, in a direction in which both of them fall down inward. Each locking pawl 30 includes an external side face 32 and an internal side face 34 opposed thereto. The space 38 is located between the internal side faces 34 of the pair of the locking pawls 30.

As shown in FIGS. 6 to 9, the internal side faces 34 opposed to each other of the pair of the locking pawls 30 are provided with a projection/recess 36 which extends from a portion at the same place as the seating portion 24 or in the vicinity thereof or from a portion far from the seating portion 24 in the clip axial direction up to a front end portion of the locking pawl 30. The projection/recess 36 of the locking pawl 30 on one side is projected/recessed in a direction opposing the locking pawl 30 on the other side. The projection/recess 36 is provided such that a projection portion 36a of the projection/recess 36 of the locking pawl 30 on one side is opposed to a recess portion 36b of the projection/recess 36 of the locking pawl 30 on the other side. That is, the internal side faces 34 of the pair of the locking pawls 30 have the comb-like projection/recess 36, and the projection/recess 36 of the locking pawl 30 on one side and the projection/recess 36 of the locking pawl 30 on the other side are shifted with respect to each other in a direction in which the longer sides of the rectangular external shapes of the pair of the locking pawls 30 extend so that the projection portion 36a of the locking pawl 30 on one side is opposed to the recess portion 36b of the locking pawl 30 on the other side. Although the projection portion 36a and the recess portion 36b extend along the clip axial direction in the shown example, they may extend in a direction perpendicular to the clip axial direction or instead, may be formed in a stripe-like pattern on the internal side face 34 of the pair of the locking pawl 30.

Because the projection portion 36a of the locking pawl 30 on one side is opposed to the recess portion 36b of the locking pawl 30 on the other side, if a pair of the locking pawls 30 falls down in a direction in which both of them approach each other when the lock pin 60 has not been inserted into the space 38, the projection portion 36a of the locking pawl 30 on one side is received by the recess portion 36b of the locking pawl 30 on the other side. As a result, an amount by which the pair of the locking pawls 30 can fall down inward is increased compared to a case where no projection/recess 36 is provided, that is, a case where the internal side faces are flat. The above-described configuration and operation can be achieved not only when the pair of the locking pawls 30 extend in the direction in which they leave the seating portion 24 and terminates at the free end, but also when the pair of the locking pawls 30 of the clip as described in the above-mentioned JP 2010-144830 A extends in a direction in which they approach the seating portion 24 and terminate at the free end.

If the pair of the locking pawls 30 extends in the direction in which they leave the seating portion 24 and terminates at the free end, the clip 10 further contains a following structure.

As shown in FIG. 7, the head portion 22 includes the seating portion 24 perpendicular to the clip central axial line 10a, a narrow portion 22a which is located on a side opposite to the locking pawl 30 with respect to the seating portion 24, and a connecting portion 22b which connects the narrow portion 22a with the seating portion 24. The width of the narrow portion 22a is smaller than the width of the seating portion 24 and the width of the connecting portion 22b increases gradually as it approaches the seating portion 24 from the narrow portion 22a.

The pair of the locking pawls 30 includes a shank portion 40 which is connected to the seating portion 24 and extends in the direction in which they leave the seating portion 24 and a pawl portion 50 which is connected to the shank portion 40 and extends in the direction in which they leave the seating portion 24. The pawl portion 50 is a portion which is located on a forward side of the shank portion 40 of the locking pawl 30. Protrusion portions 56 which project in a direction in which they leave each other are provided on external side faces of the pawl portions 50 of the pair of the locking pawls 30. The protrusion portion 56 is a part which configures part of the pawl portion 50 and located outside (a far side from the space 38) an extension line in a direction in which they leave the seating portion 24 of an external face of the shank portion 40 and in parallel to the seating portion 24.

When the clip 10 is mounted on a vehicle body 90 by inserting the pair of the locking pawls 30 into a clip mounting hole 92 in the body 90, the shank portion 40 of the locking pawls 30 faces an internal peripheral face of an edge portion thereof. The pawl portion 50 has passed the clip mounting hole 92, so that the pawl portion 50 does not face the internal peripheral face of the edge portion of the clip mounting hole 92. The amount of interference of a maximum protrusion portion 56a of the protrusion portion 56 with the edge portion of the clip mounting hole 92 in the vehicle body 90 is an engagement allowance D (FIG. 7) of the locking pawl 30 with the edge portion of the clip mounting hole 92 when the clip 10 is mounted on the body 90.

The shank portion 40 which is constituted of a pair includes external side faces 42 which are separated from each other and internal side faces 44 which are opposed to each other. The pawl portion 50 which is constituted of a pair includes external side faces 52 which are separated from each other and internal side faces 54 which are opposed to each other. The internal side face 34 of the locking pawl 30 includes the internal side face 44 of the shank portion 40 and the internal side face 54 of the pawl portion 50. The external side face 32 of the locking pawl 30 includes the external side face 42 of the shank portion 40 and the external side face 52 of the pawl portion 50. The external side face 52 of the pawl portion 50 includes an engaging face 52a capable of engaging with the edge portion of the clip mounting hole 92 when the clip 10 is mounted on the body 90, an enlargement inclined face 52b which is connected to the engaging face 52a and inclined such that a distance from the clip central axial line 10a increases as it leaves the seating portion 24 more, and a reduction inclined face 52c which is connected to the enlargement inclined face 52b and is inclined such that a distance from the clip central axial line 10a decreases as it leaves the seating portion 24. The maximum protrusion portion 56a is located at a transfer position from the enlargement inclined face 52b to the reduction inclined face 52c.

By providing the pawl portion 50 with the enlargement inclined face 52b, even if an oblique load is applied to the clip 10 so that the clip 10 inclines, the interference amount between the locking pawl 30 and the edge portion of the clip mounting hole 92 is inhibited from decreasing. Further, by providing a front end portion of the pawl portion 50 with the reduction inclined face 52c, the pair of the locking pawls 30 automatically fall down inward only by pressing the clip 10 into the clip mounting hole 92 at the time of mounting the clip, so that the pawl portion 50 can pass through the clip mounting hole 92.

The protrusion portion 56 of each pawl portion 50 is formed integrally with each locking pawl 30 in a direction perpendicular to the clip axial direction over the entire length or substantially entire length of the locking pawl 30 to form part of the locking pawl 30. To the contrary, in the case of the clip described in the above-described JP 2010-144830 A, if a pair of the locking pawls are arranged in the opening portion of the leg portion such that they extend in a direction in which they approach the seating portion and terminate at the free ends, the locking pawls cannot be formed over the entire length or substantially entire length of the leg portion. As a result, the shearing strength in the clip axial direction of the locking pawl cannot be secured to be so large as the present invention can ensure. If in the case of the clip described in the above-described JP 2010-144830 A, the oblique load is applied to the clip so that the clip inclines, the shearing longitudinal sectional area in the clip axial direction of the locking pawl decreases. Thus, the shearing strength in the clip axial direction of the locking pawl cannot be secured to be so large as the present invention ensures.

In case of a clip with a lock pin as shown in FIGS. 1 to 9, the clip 10 is provided with the lock pin 60. As shown in FIG. 1, the lock pin 60 includes a pin head portion 62 and a pin leg portion 66. A pin pawl portion 64 is formed on the pin head portion 62. On the other hand, in the head portion 22 of the clip main body 10, a temporary holding hole 26 which receives the pin pawl portion 64 to hold the lock pin 60 temporarily and a final holding hole 28 which receives the pin pawl portion 64 to hold the lock pin 60 finally are formed in the wall of the lock pin insertion hole 20a. In the lock pin insertion hole 20a, the final holding hole 28 is provided on a deeper side with respect to the temporary holding hole 26.

The lock pin 60 has side faces 68. The pin leg portion 66 of the lock pin 60 includes a root side specified thickness portion 72, a projection/recess portion 70 and a front end side specified thickness portion 74 which is thinner than the root side specified thickness portion 72. The projection/recess portion 70 has projection portions 70a and recess portions 70b of the lock pin 60. The lock pin thickness in the projection portion 70a of the lock pin 60 is equal to the lock pin thickness in the root side specified thickness portion 72, and the lock pin thickness in the recess portion 70b of the lock pin 60 is equal to the lock pin thickness in the front end side specified thickness portion 74.

The pin leg portion 66 of the lock pin 60 can be inserted into the space 38 between the internal side faces 34 of the pair of the locking pawls 30. As shown in FIG. 9, when the lock pin 60 is inserted into the space 38, the front end face of the projection portion 36a of the projections/recesses 36 provided on the internal side face 34 of the pair of the locking pawls 30 contacts the side face 68 of the lock pin 60, for example, the side face 68 of the front end side specified thickness portion 75 to inhibit deformation of the pair of the locking pawls 30 from being deformed in a direction in which they approach each other. In the pawl portion 50, the lock pin 60 never rushes in the recess portion 36b of the projection/recess 36, thereby not filling the space in the recess portion 36b.

Figure 8:
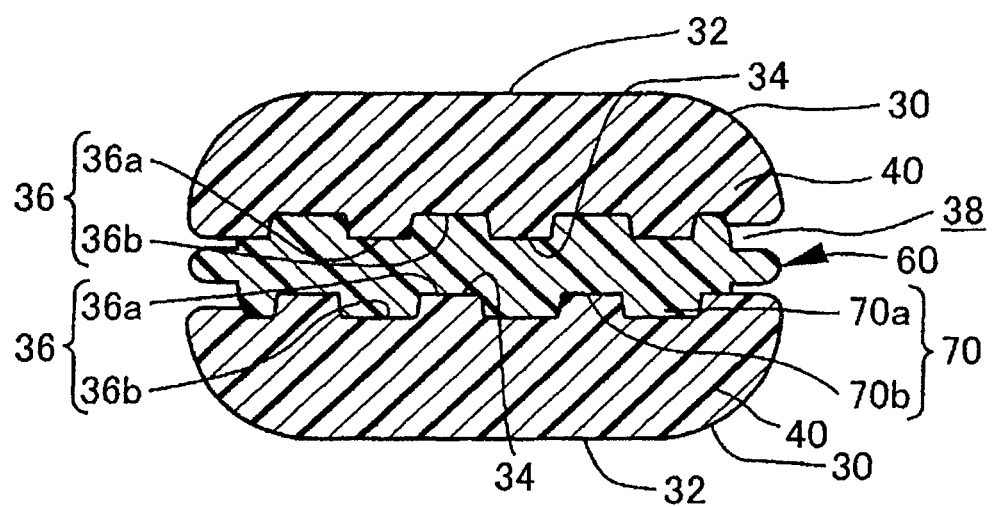
FIG. 8 is a sectional view taken along the line VIII-VIII of the clip of FIG. 4.

The projection/recess 36 on the internal side face 34 of the pair of the locking pawls 30 is formed in at least part of the shank portion 40 of the pair of the locking pawls 30 and in at least part of the pawl portion 50. The projection/recess portion 70 of the lock pin 60 is formed in a portion corresponding to the shank portion 40 of the locking pawl 30 when the pin leg portion 66 of the lock pin 60 is inserted into the space 38. As shown in FIG. 8, when the pin leg portion 66 of the lock pin 60 is inserted into the space 38, the projection portion 70a of the projection/recess portion 70 of the lock pin 60 rushes in the recess portion 36b of the pair of the locking pawls 30 and fills the recess portion 36b almost without any gap.

FIGS. 10 and 11 show the CSA mounting structure 2. The CSA mounting structure 2 may be also called CSA mounting device 2. The CSA mounting structure 2 includes a CSA 80, a vehicle body 90 on which the CSA 80 is to be mounted, and the above-described clip 10 for use in mounting the CSA 80 on the vehicle body 90.

The vehicle body 90 on which the CSA 80 is to be mounted is the A pillar, for example. However, it is not limited to the A pillar. If the body 90 is the A pillar, the body 90 contains an inner panel 90a, an outer panel 90b and a reinforcement 90c. In addition, FIG. 10 also illustrates a front shield glass 94 for a vehicle, a weather strip 96, and an A pillar garnish 98.

The CSA 80 includes a main body 80a and a tab 80b. The CSA 80 is made of fabric and accommodated in a space between the A pillar garnish 98 and the inner panel 90a in a state in which it is folded in the form of roll or bellows. In case of the roll type folding, the external shape of the section of the main body 80a of the CSA 80 is substantially circular as shown in FIG. 10 and in case of the bellow type folding, it is substantially rectangular. The CSA main body 80a is located on an opposite side (backward of a vehicle) of the clip 10 with respect to the front shield glass 94 and extends in a longitudinal direction of the CSA.

As shown in FIG. 10, the clip 10 is mounted on an inner panel 90a in a state in which the tab 80b of the CSA 80 and a spacer 82 of resin are sandwiched between the head portion 22 of the clip 10 and the inner panel 90a.

As shown in FIG. 10, the width of the narrow portion 22a of the head portion 22 of the clip main body 20 is smaller than the width of the seating portion 24 in a direction P perpendicular to the longitudinal direction of the CSA. Thus, the external shape of the section of the CSA 80 is closer to the clip central axial line 10a thereby enabling the width of the A pillar garnish 98 to be reduced.

As shown in FIG. 10, in a state in which the clip 10 is mounted on the body 90, the pair of the locking pawls 30 has passed through the clip mounting hole 92 in the body 90. When the pair of the locking pawls 30 pass through the clip mounting hole 92, the lock pin 60 is located at a position corresponding to the temporary holding hole 26, so that the pin leg portion 66 has not been inserted into the space portion 38 between the pair of the locking pawls 30. As a result, the pair of the locking pawls 30 are capable of falling down inward and deformable. After the pair of the locking pawls 30 have passed through the clip mounting hole 92, the lock pin 60 is pressed from the temporary holding hole 26 up to the final holding hole 28, so that the pin leg portion 66 is inserted into the space 38 between the pair of the locking pawls 30. As a result, the pair of the locking pawls 30 are inhibited from being deformed in a direction in which they approach each other. When the lock pin 60 is pressed up to the final holding hole 28, the clip 10 is locked into the body 90 so that it cannot be removed.

As shown in FIGS. 10, 11, at the time of vehicle collision, inflation gas is supplied from an inflator (not shown) to inflate the CSA 80. The A pillar garnish 98 is pushed by this inflation pressure in a direction in which it leaves the inner panel 90a. The CSA 80 is inflated into a vehicle compartment and between an occupant and a side door (side glass) through a gap formed between the A pillar garnish 98 and the inner panel 90a so as to restrain the occupant from the side door side. In FIG. 10, reference numeral 98' indicates a situation in which the A pillar garnish 98 has been inflated and reference numeral 80' indicates part of the CSA 80 in an inflated state. When the CSA 80 is inflated, an oblique tensile force is applied to the clip 10 from the CSA 80 in a pulling direction.

Next, operation and effect of the clip 10 and the CSA mounting structure 2 will be described.

First, because the projection/recess 36 is provided on the internal side faces 34 opposed to each other of the pair of the locking pawls 30, the deformable amount in a direction in which the pair of the locking pawls 30 approach each other is increased compared to a case where no projection/recess 36 is provided. As a result, with the pair of the locking pawls 30 allowed to pass through the clip mounting hole 92, the engagement allowance D (see FIG. 7) in the locking pawl deformable direction between the pair of the locking pawls 30 and the edge portion of the clip mounting hole 92 can be increased. In addition, the bending rigidity of the locking pawls 30 can be increased. As a result, chipping, crushing deformation and bending deformation of the locking pawls 30 in the clip axial direction are inhibited to increase the CSA holding performance of the clip 10.

In addition, the locking pawl 30 which is constituted of the shank portion 40 and the pawl portion 50 extends in the direction in which it leaves the seating portion 24 and the pawl portion 50 of the pair of the locking pawls 30 has the protrusion portion 56 which project in the direction in which they leave each other. The enlargement inclined face 52b whose distance from the clip central axial line 10a increases as it leaves the seating portion 24 is formed on part of the external side face of the protrusion portion 56. Thus, compared to a clip whose distance from the clip central axial line decreases as the external side face of the locking pawl leaves the seating portion, the projecting portion 56 can have a large engagement allowance D with the edge portion of the clip mounting hole 92. Further, the protrusion portion 56 can have a large shearing sectional area S (see FIG. 7) along the clip central axial line 10a passing through the internal face of the clip mounting hole 92. As a result, when a load is applied to the protrusion portion 56 from the edge portion of the clip mounting hole 92, the protrusion portion 56 can bear the load with a sufficient shearing strength.

Further, because the external side face 52 of the pawl portion 50 of the locking pawl 30 has the enlargement inclined face 52b which leaves from the clip central axial line 10a as the external side face 52 leaves the seating portion 24, even if an oblique tensile force is applied to the clip 10 from the CSA 80 in the pulling direction so that the clip 10 inclines, the shearing area S (see FIG. 7) of the protrusion portion 56 is kept at a large value thereby securing a large CSA holding performance. To the contrary, in case of the clip in which the locking pawl extends toward the seating portion from the connecting position with the leg portion which is located far from the seating portion and the external side face thereof is formed into the reduction inclined face which approaches the clip central axial line as it leaves the seating portion, if the clip inclines, the shearing sectional area of the pawl portion decreases so that the CSA holding performance decreases, which is a problem to be solved. However, such a problem of the clip is solved by the present invention.

Because the protrusion portion 56 is formed on the pawl portion 50 over the entire width or substantially entire width of the locking pawl 30, compared to the clip in which the locking pawl (corresponding to the pawl portion 50 of the present invention) is formed on only part in the width direction of the leg portion (corresponding to the locking pawl 30 of the present invention), the shearing strength of the pawl portion 50 and the locking pawl 30 in the clip axial direction and a direction perpendicular to the clip axial direction is increased thereby intensifying the CSA holding performance of the clip 10.

Further, by inserting the lock pin 60 into the space 38, the deformation of the pair of the locking pawls 30 in the direction in which they approach each other is inhibited, so that the clip can be locked by installing the pawl portion 50 of the clip 10 at the edge portion of the clip mounting hole 92 in the body 90.

Further in detail, because when the pin pawl portions 64 engage with the temporary holding holes 26, the front end side specified thickness portion 74 of the pin leg portion 66 is not located between the pair of the pawl portions 50 and thus, the pair of the locking pawls 30 can fall down inward so that they are deformable. With this state, the pair of the locking pawls 30 are inserted through the hole in the tab 80b of the CSA 80 and the hole in the spacer 82, and then, the pair of the locking pawls 30 are pressed into the clip mounting hole 92 in the body 90 with the pair of the locking pawls 30 falling down inward and being deformed. After the pair of the locking pawls 30 pass through the clip mounting hole 92 in the body 90, the pair of the locking pawls 30 are restored to their original positions where they have not fallen down inward due to elastic deformation and after that, the lock pin 60 is pressed to a position where the pin pawl portions 64 engage with the final holding holes 28. Because in this state, the front end side specified thickness portion 74 of the pin leg portion 66 is located between the pair of the pawl portions 50 (FIGS. 9, 6), the pair of the locking pawls 30 cannot fall down inward due to deformation, so that the pawl portion 50 of the clip 10 is locked by the edge portion of the clip mounting hole 92 in the body 90 such that it is unremovable.

Figure 6:
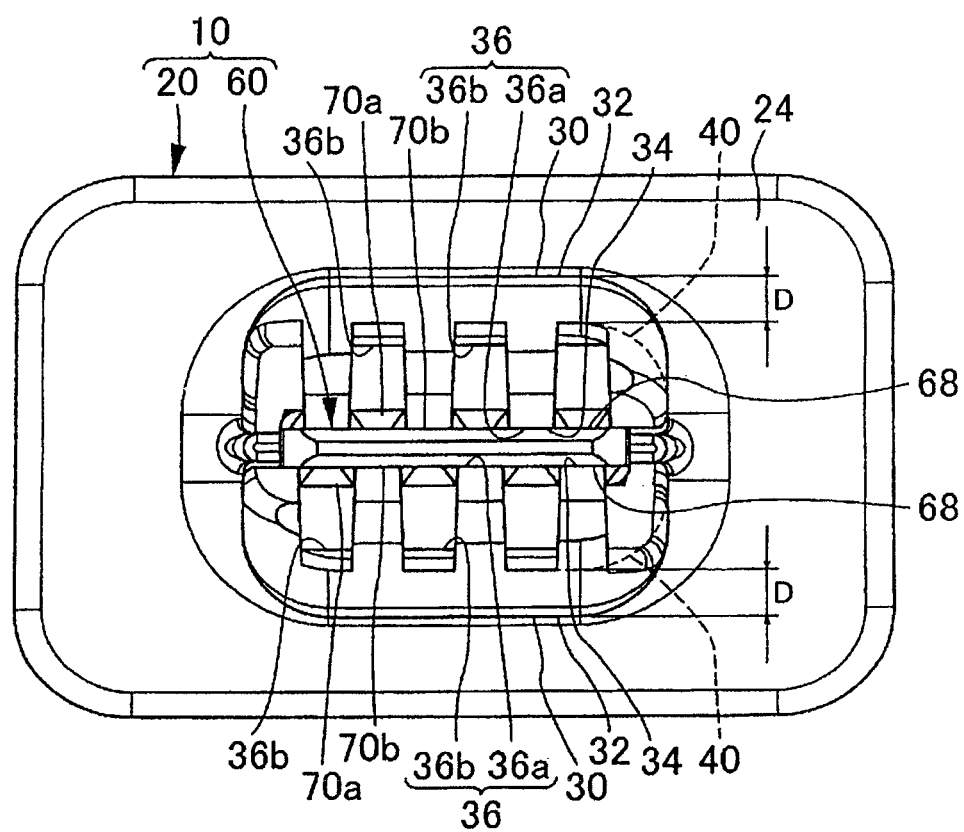
FIG. 6 is a bottom view of the clip of FIG. 4.

When the lock pin 60 has been inserted into the space 38 up to a position where the pin pawl portions 64 engage with the final holding holes 28, the projection portions 70a of the projection/recess portion 70 of the lock pin 60 rush in the recess portions 36b formed in the shank portion 40 of the locking pawl 30, so that the recess portions 36b in the shank portion 40 are substantially filled (FIGS. 8, 6). As a result, even if the shank portions 40 of the locking pawls 30 of the clip 10 receive a shearing force from the edge portion of the clip mounting hole 92 in the direction perpendicular to the clip central axial line 10a, the deformation of the clip 10 is inhibited thereby increasing the CSA holding performance of the clip 10.

According to the CSA mounting structure 2 of the present invention, because the CSA 80 is mounted on the vehicle body 90 using the above-described clip 10 having a large strength, the CSA mounting structure 2 whose holding strength for the CSA 80 has been improved can be provided.

A clip 211 according to a second embodiment of the present invention and if the clip 211 is a tether clip, a pillar garnish mounting structure (which may be referred to as pillar garnish mounting device) 201 in which the pillar garnish is mounted on the body using the tether clip will be described with reference to FIGS. 12 to 21. Because the main component of the pillar garnish mounting structure 201 is the clip 211, the main component of the clip 211 and the main component of the pillar garnish mounting structure 201 are the same.

<<Structure>>

[Structure of Clip]

First, the structure of the clip 211 will be described together with the operation thereof. FIGS. 12 to 19 show the clip 211. Although the figure indicates a case where the clip 211 is a tether clip (designated with like reference numeral as the clip), the clip 211 may be other type clip than the tether clip 211 and for example, an ordinary fixing clip for fixing the CSA to the body may be used.

The clip main body 211 is formed of resin material having flexibility. The resin material is, for example, polyhexamethylene adipamide. However, any other resin materials may be used as long as it is a resin material having flexibility and a necessary strength.

The clip 211 has a clip central axial line 211a. The clip 211 is constituted of a clip main body 220. The clip main body 220 includes a single seating portion 225, a single shank portion 221 which extends in a direction in which it leaves the seating portion 225, and at least a pair of locking pawls 231 which extend from connecting portions 241 with the shank portion 221 located at a position far from the seating portion 225 in the clip axial direction toward the seating portion 225 and terminate at free ends. It is permissible to provide a plurality of pairs of locking pawls 231.

A shank portion 221 is perpendicular to a seating portion 225. The central axial line of the shank portion 221 is corresponding to a central axial line 211a of the clip 211. The shank portion 221 is hollow. The external shape of the section of the shank portion 221 in a direction perpendicular to a clip central axial line 211a is substantially circular or substantially rectangular. The rectangle includes a case of square.

A pair of opening portions are provided at portions opposed to each other of the hollow shank portion 221 and a pair of locking pawls 231 are provided there. The pair of the locking pawls 231 are opposed to each other in a direction perpendicular to the clip axial direction.

The locking pawl 231 is connected to the wall of the shank portion 221 through the connecting portion 241. The locking pawl 231 is separated from the shank portion 221 and the seating portion 225 except the connecting portion with the shank portion 221. That is, except the connecting portion 241 with the shank portion 221, an inverted U-shaped slit 243 exists between the shank portion 221/the seating portion 225 and the locking pawl 231. The locking pawl 231 extends from the connecting portion 241 toward the seating portion 225. Because the clip 211 is formed of resin material having flexibility, the locking pawl 231 is elastically deformable in a direction in which it approaches/ departs from the clip central axial line 211a, that is, in a direction in which it falls down or rises around the connecting portion 241.

The pair of the locking pawls 231 include internal side faces 235 opposed to each other and external side faces 233 located on an opposite side to the internal side faces 235. The internal side face 235 is opposed to the clip central axial line 211a. A space 239 is secured between the internal side faces 235 of the pair of the locking pawls 231. The space 239 also serves as a space in the hollow shank portion 221. The space 239 extends along the clip axial direction in a direction in which it leaves the seating portion 225 and is open outside the shank portion at an end far from the seating portion 224 of the shank portion 221.

A projection/recess 237 which is projected or recessed in opposing direction of the pair of the locking pawls 231 is formed on the internal side faces 235 opposed to each other of the pair of the locking pawls 231. The projection/recess 237 includes a projecting portion 237a and a recessed portion 237b. Of the pair of the locking pawls 231 opposed to each other, the projecting portion 237a of the locking pawl 231 on one side and the recessed portion 237b of the locking pawl 231 on the other side are formed so as to be opposed to each other in an opposing direction of the pair of the locking pawls 231. When the pair of the locking pawls 231 fall down around the connecting portion 241 in a direction in which they approach each other and are deformed, the projecting portion 237a of the locking pawl 231 on one side rushes in the recessed portion 237b of the locking pawl 231 on the other side. As a result, compared to a case where no projection/recess 237 is provided, the deformable amount by which the pair of the locking pawls 231 can fall down in the direction in which they approach each other increases and in addition, bending rigidity in the deflection direction (falling direction) of each locking pawl 231 increases.

Each locking pawl 231 includes engaging portions 245 and engagement releasing portions 247. The engaging portion 245 and the engagement releasing portion 247 are far from each other in the clip axial direction. In a free state of the locking pawl 231 (a state in which no load is applied to the locking pawl 231), the engaging portion 245 is projected from the external face of the shank portion 221 in a direction in which it departs from the clip central axial line 211a. That is, in the locking pawl 231, a portion projected from the external face of the shank portion 221 in the direction in which it departs from the clip central axial line 211a is the engaging portion 245. The engaging portion 245 has an inclined portion 249 which extends from the connecting portion 241 toward the seating portion 225 side front end of the locking pawl 231 in a direction in which it leaves the clip central axial line 211a at least at part of the engaging portion 245 in the direction along the clip central axial line 211a. When the clip 211 is inserted into the clip mounting hole 293, the inclined portion 249 serves as a sliding face which slides on the internal peripheral face of the clip mounting hole 293. The engaging portion 245 may have a parallel portion which is parallel to or substantially parallel to the clip central axial line 211a as well as the inclined portion 249.

When the clip 211 is inserted into the clip mounting hole 293, the engaging portion 245 of the locking pawl 231 is pressed by the internal peripheral face of the clip mounting hole 293, so that it falls down in the direction in which it approaches the clip central axial line 211a and is deformed. When the engaging portions 245 pass through the clip mounting hole 293, they are elastically restored to the original positions. After elastically restored to the original positions (positions in the free state), faces opposed to the seating portion 225 of the engaging portions 245 engage with the peripheral portions of the clip mounting hole 293 in the body 291 along the clip axial direction, so that the clip 211 becomes unremovable from the clip mounting hole 293. An amount by which the engaging portion 245 engages with the peripheral portion of the clip mounting hole 293 after the locking pawls 231 are elastically restored to the original positions when installation of the clip 211 to the clip mounting hole 293 is completed is an engagement allowance D (FIG. 19) of the locking pawl 231 with respect to the peripheral portion of the clip mounting hole 293.

The engagement releasing portions 247 are provided at front ends of the locking pawls on a side near the seating portion 225 and extend in a direction in which they leave the clip central axial line 211a. The external side end on a far side from the clip central axial line 211a of the engagement releasing portion 247 is located at a position farther from the clip central axial line 211a than the external side end of the engaging portion 245. The external side end on a far side from the clip central axial line 211a of the engagement releasing portion 247 is located at a position farther from the clip central axial line 211a than the external side end of the seating portion 225 in the same direction. If the clip 211 is removed from the clip mounting hole 293 at a service time, the engagement releasing portion 247 of the pair of the locking pawls 231 are pressed in the direction in which both of them approach each other until a distance between the external side faces of the pair of the engaging portions 245 becomes an inside diameter of the clip mounting hole 293 or less, and then, the clip 211 is pulled in the clip axial direction to pull the shank portion 221 out of the clip mounting hole 293.

The projection/recess 237 is formed on the internal side faces 235 of the locking pawls 231 and the internal faces 227 of the shank portions 221 from the front end of the locking pawl on a side near the seating portion 225 up to the front end of the shank portion 221 on a side far from the seating portion 225. The projection/recess 237 is formed both on an entire length of the locking pawl 231 in the clip axial direction and on a portion extending from the connecting portion 241 with the locking pawl 231 up to the front end of the shank portion 221 on the far side from the seating portion 225. The projection portion 237a and the recess portion 237b of the projection/recess 237 extend linearly in the clip axial direction and are formed by the same molding processing as for the clip 211. In the meantime, the projections/recesses may be formed on the internal side faces opposed to each other of the engagement releasing portions provided on the locking pawls.

The shank portion 221 may have a split portion 221a which extends in the clip axial direction and open to the front end of the shank portion 221 on the far side from the seating portion 225. If the shank portion 221 has the split portion 221a, the front end on the far side from the seating portion 225 of the shank portion 221 is discontinuous in the circumferential direction of the shank portion 221. If the shank portion 221 has the split portion 221a, the shank portion 221 comes to have elasticity in the radius direction so that the clip becomes easier to insert into the clip mounting hole 293 and more likely to be caught by the periphery of the clip mounting hole 293.

When the clip is mounted on the body 291 by inserting the shank portion 221 of the clip 211 into the clip mounting hole 293 of the body 291, the body 291 is positioned between the engaging portion 245 and the engagement releasing portion 247. At this time, the body 291 is sandwiched between a face opposed to the seating portion of the engaging portion 245 of the locking pawl 231 and a spacer 223. The spacer 223 may be a piece separate from the clip 211 or may be formed integrally with the clip 211. The indicated example shows a case where the spacer 223 is constituted of an integrated spacer formed integrally with the clip 211. The spacer 223 has elasticity in the clip axial direction and contacts the body 291 from its seating portion 225 side to eliminate backlash between the body 291 and the clip 211. Although the above-described structure is about a case where the clip 211 is a tether clip for mounting the pillar garnish on the body, it may be applied to a CSA mounting clip for mounting the CSA on the body.

[Tether Clip and Structure of Pillar Garnish Mounting Structure]

Next, the configuration of the tether clip 211 in case where the clip 211 is the tether clip (designated with the same reference numeral 211 as the clip) and the configuration of the pillar garnish mounting structure 201 which uses the tether clip 211 will be described together with their operations.

[Relationship Between Tether Clip and Pillar Garnish Mounting Structure]

Figure 20:
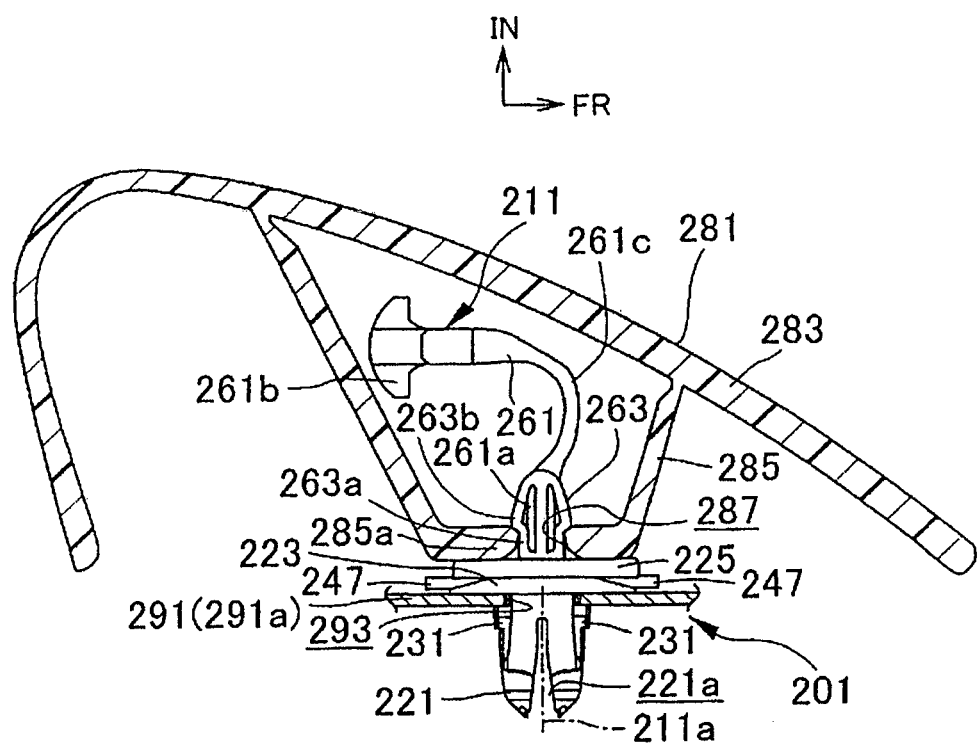
FIG. 20 is a sectional view of the pillar garnish mounting structure using the clip of FIG. 12.
Figure 21:
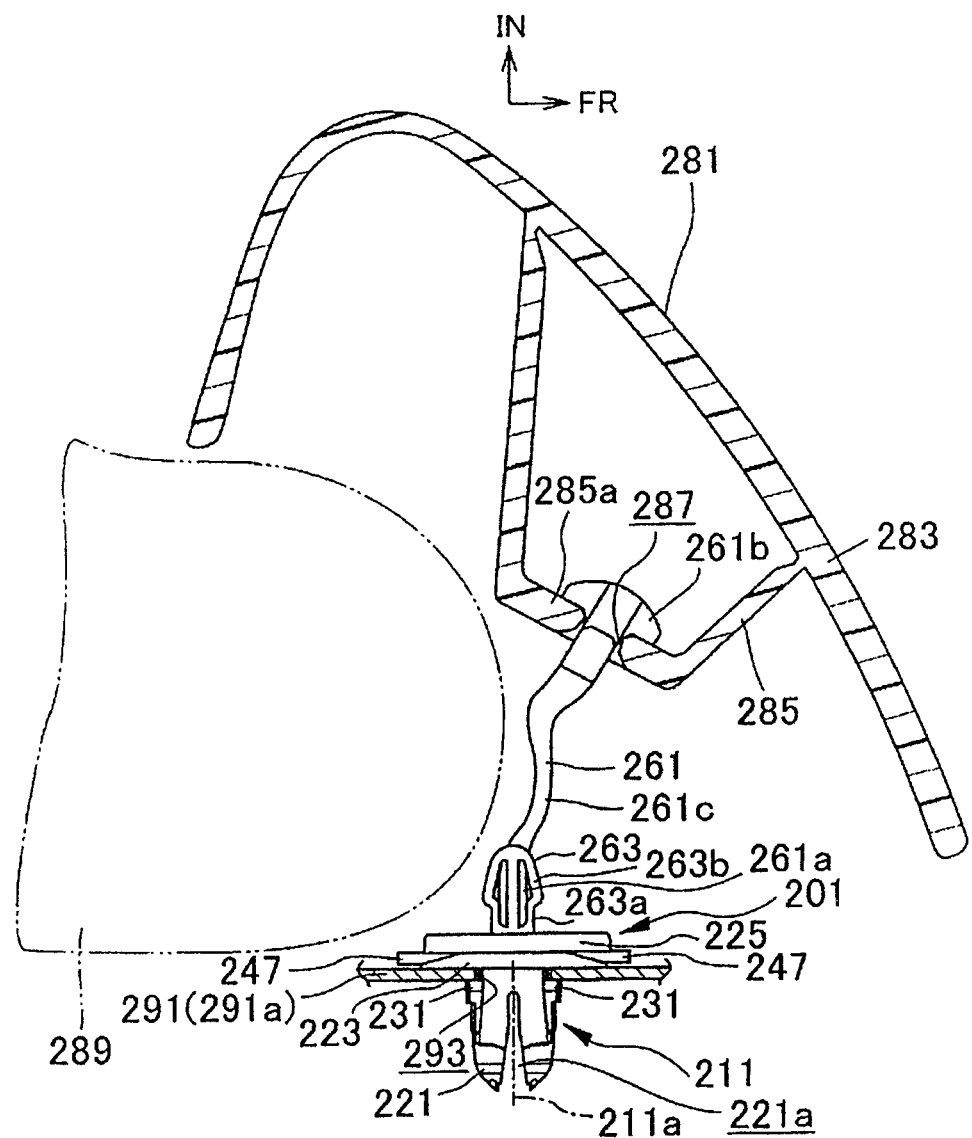
FIG. 21 is a sectional view of the pillar garnish mounting structure of FIG. 20 at the time of inflation of a CSA.
Figure 22:
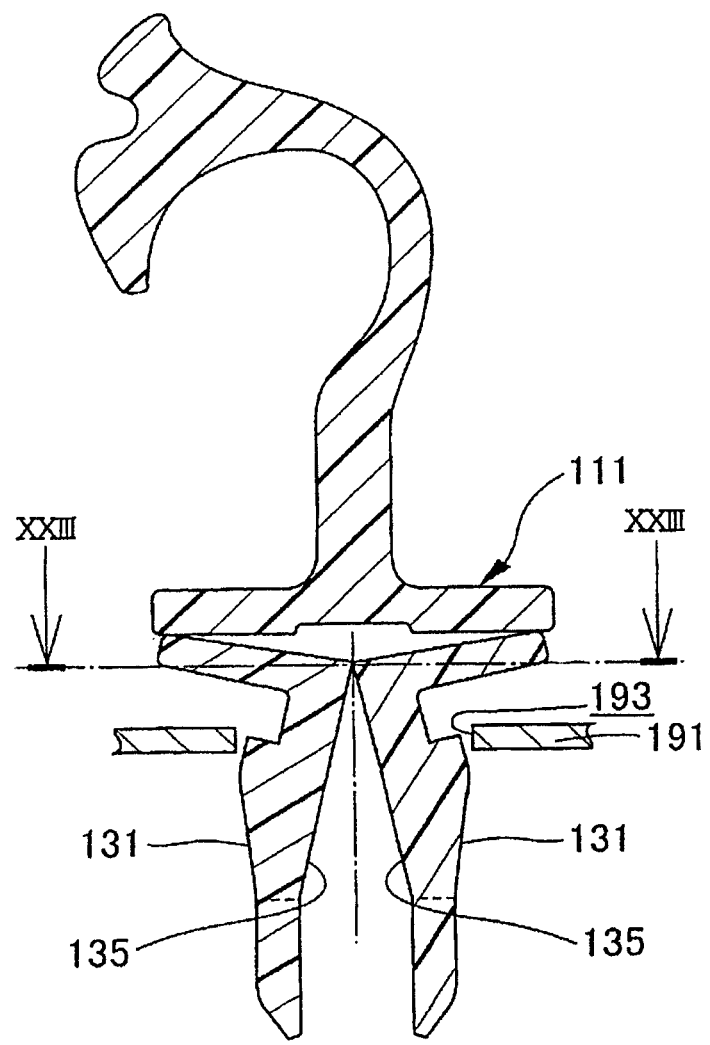
FIG. 22 is an end face view of a section corresponding to FIG. 12 of a comparative clip.
Figure 23:
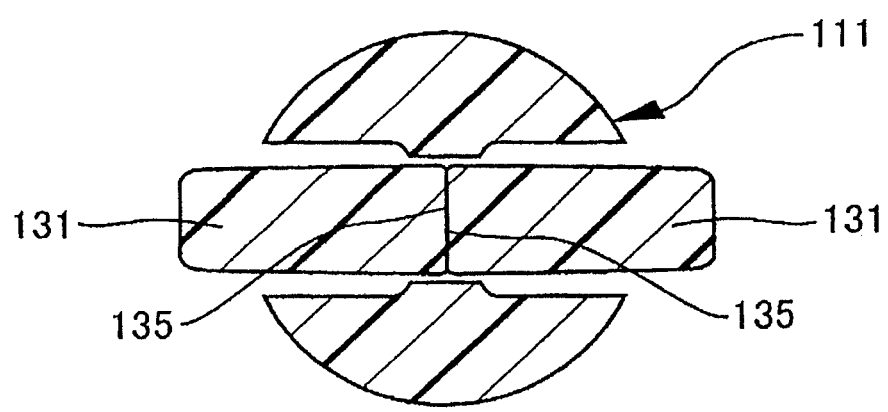
FIG. 23 is a sectional view taken along the line XXIII-XXIII of the clip of FIG. 22.
Figure 24:
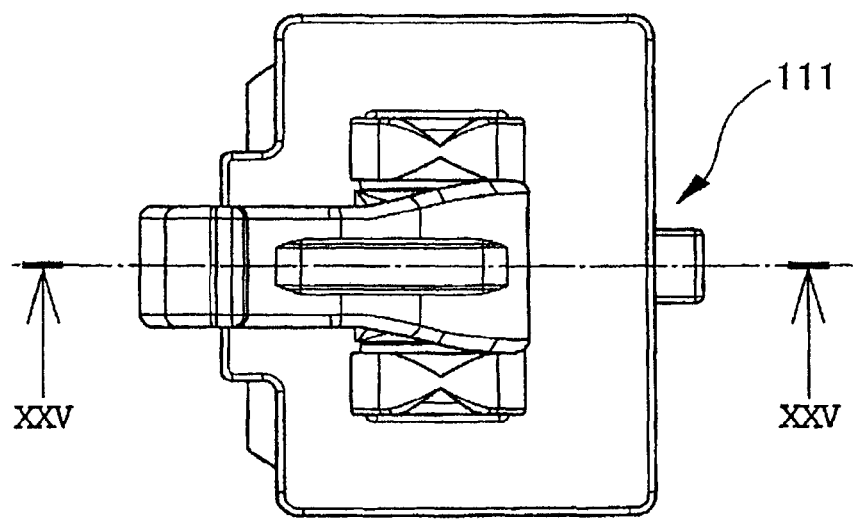
FIG. 24 is a plan view of the clip of FIG. 22.

FIGS. 20, 21 show the pillar garnish mounting structure 201. In FIGS. 20 and 21, FR indicates forward of a vehicle and IN indicates inward in the right-left direction of the vehicle. The pillar garnish 281 is mounted on an inner panel 291a of a pillar of the body 291 with the tether clip 211. The pillar garnish 281 includes a garnish main body 283 and a pedestal portion 285. A rectangular tether portion insertion hole 287 is provided in a bottom wall 285a of the pedestal portion 285. The CSA 289 is accommodated in a space between the inner panel 291a of the pillar which is the body 291 and the garnish main body 283 in a folded state. Upon collision of vehicles, the CSA 289 is expanded and inflated. In FIG. 21, the CSA 289 in the inflated state is indicated with two-dot chain line.

[Structure of Tether Clip]

As shown in FIGS. 12, 14, 16, 18 and 19, the tether clip 211 has a tether portion 261 and an engagement holding portion 263. The tether portion 261 and the engagement holding portion 263 may have the same structure as a tether portion and an engagement holding portion of a comparative tether clip.

The tether portion 261 includes a rising portion 261a which rises from the seating portion 225 to an opposite side to the shank portion 221, an anchor portion 261b which is provided at a front end far from the seating portion 225 and a connecting portion 261c which connects the rising portion 261a to the anchor portion 261b. The connecting portion 261c may be curved. The curve direction of the connecting portion 261c may be perpendicular to the longitudinal direction of the pillar garnish 281 or in the longitudinal direction of the pillar garnish 281.

The anchor portion 261b has a smaller rectangular external shape than the tether portion insertion hole 287 in the pedestal portion 285 of the pillar garnish 281. When the tether portion 261 is inserted into the pedestal portion 285, the anchor portion 261b and the tether portion insertion hole 287 are aligned with each other in terms of the phase and the anchor portion 261b is passed through the tether portion insertion hole 287. After the tether portion 261 has been inserted into the pedestal portion 285, the tether clip 211 is turned around the central axial line 211a by 90°, so that the anchor portion 261b becomes non-removable from the pedestal portion 285. With the tether clip 211 mounted on the pillar garnish 281, the pillar garnish 281 is pressed toward the body 291 side and the shank portion 221 of the tether clip 211 is pressed into the clip mounting hole 293 in the body 291. As a result, the pillar garnish 281 with the tether clip 211 is mounted on the body 291. FIG. 20 shows a state in which the pillar garnish 281 with the tether clip 211 has been mounted on the body 291.

The engagement holding portion 263 rises from the seating portion 225 to an opposite direction to the shank portion 221. The engagement holding portion 263 is provided on sides of the rising portion 261a of the tether portion 261. The engagement holding portion 263 is provided at a position separate from the rising portion 261a.

Figure 14:
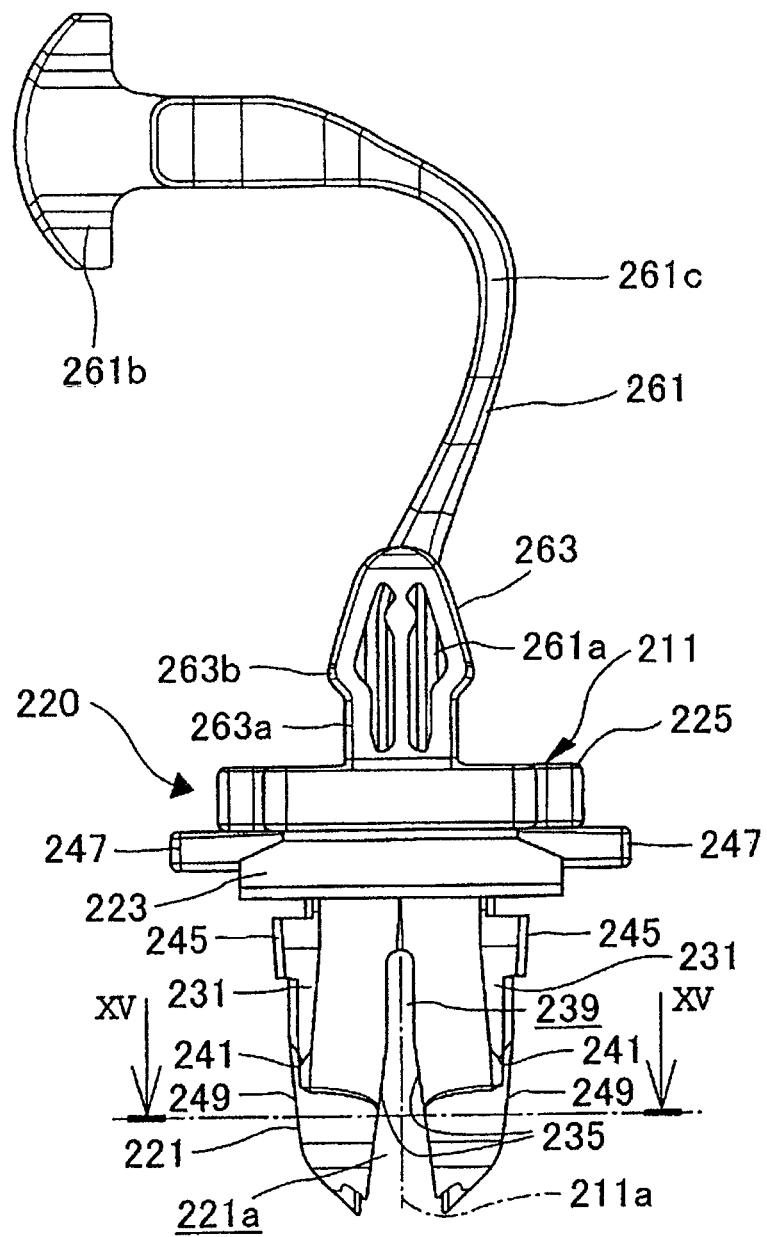
FIG. 14 is a front view of the clip of FIG. 12.
Figure 15:
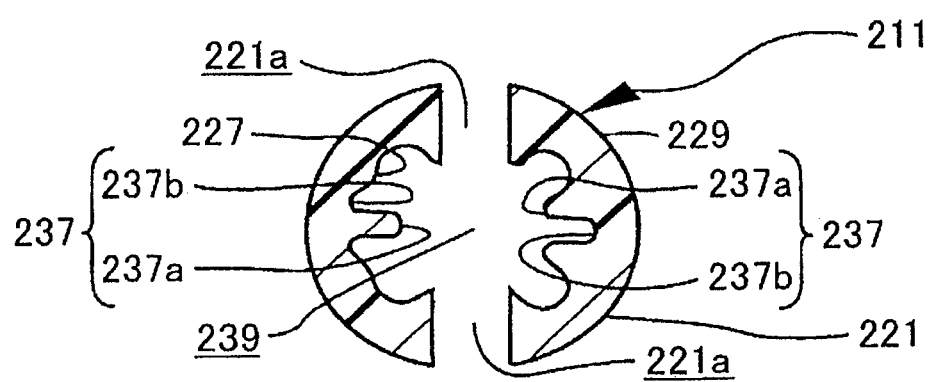
FIG. 15 is a sectional view taken along the line XV-XV of the clip of FIG. 14.
Figure 16:
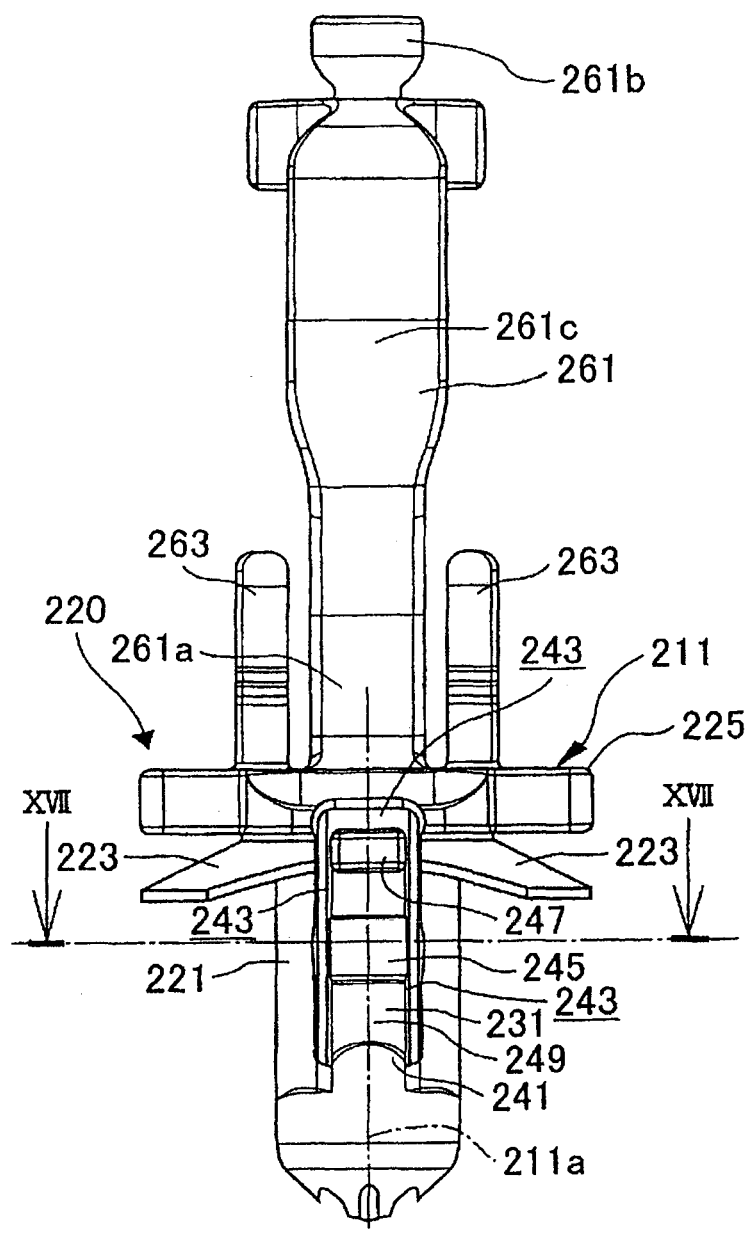
FIG. 16 is a side view of the clip of FIG. 14.
Figure 17:
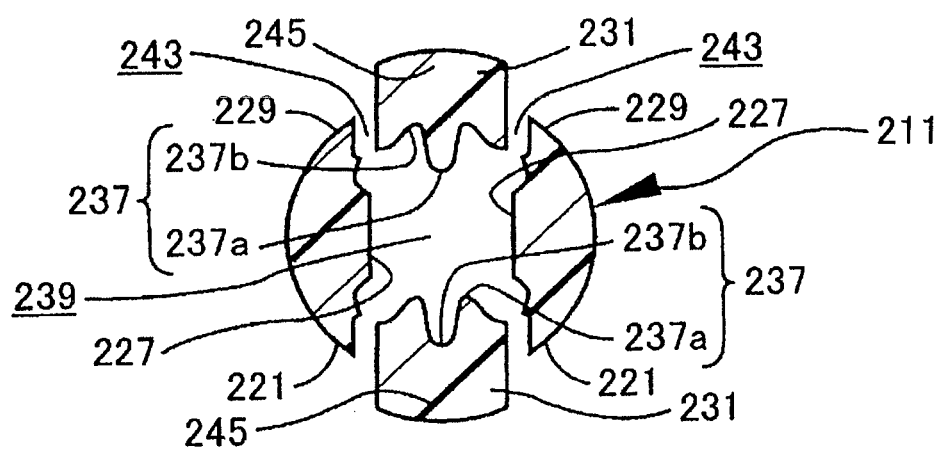
FIG. 17 is a sectional view taken along the line XVII-XVII of the clip of FIG. 16.
Figure 18:
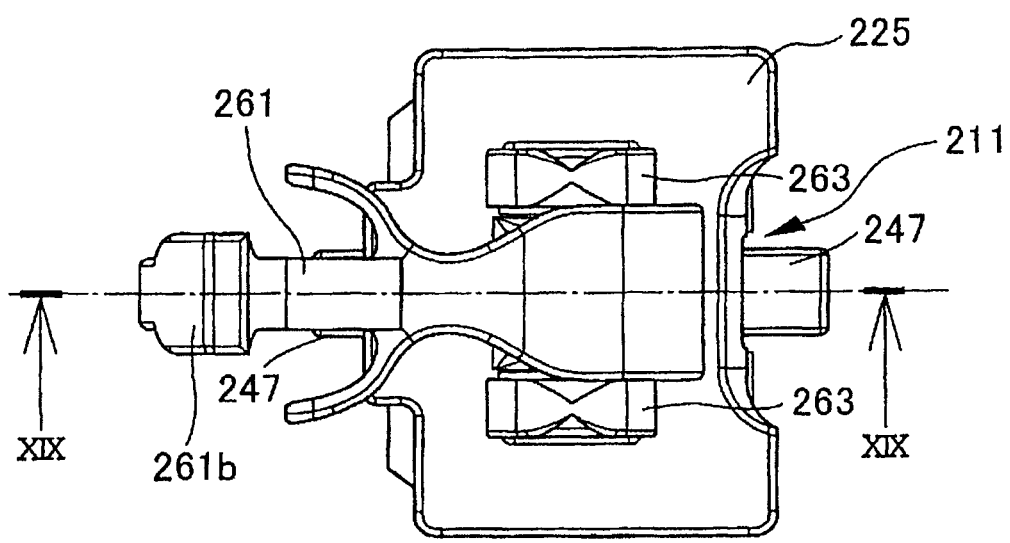
FIG. 18 is a plan view of the clip of FIG. 14.

As shown in FIGS. 14, 20, 21, the engagement holding portion 263 includes a rising portion 263a which rises from the seating portion 225 by substantially the same amount as the thickness of the pedestal portion bottom wall 285a having the tether portion insertion hole 287 and an expanded portion 263b which extends from a front end of the rising portion 263a in a direction leaving the seating portion 225 and is expanded in a direction perpendicular to the rising direction of the rising portion 263a. The expanded portion 263b is formed in a hollow shape having elasticity in a direction perpendicular to the rising direction.

When the tether clip 211 is mounted on the pillar garnish 281, the engagement holding portion 263 is pressed into the tether portion insertion hole 287 in the pedestal portion 285. At this time, the expanded portion 263b is elastically deformed in a direction in which its expanding amount decreases and passes through the tether portion insertion hole 287, so that the expanded portion 263b enters into the pedestal portion 285. After the expanded portion 263b passes the tether portion insertion hole 287, it is elastically restored to an original position (position with the free state) of the expanded portion 263b so that the pedestal portion 285 is held between the expanded portion 263b and the integrated spacer 223. With this state, the tether clip 211 is mounted on the body 291.

At the time of inflation of the CSA, when the pillar garnish 281 is pushed by the CSA 289, the peripheral portion of the tether portion insertion hole 287 pushes the expanded portion 263b of the engagement holding portion 263 in a pull-out direction so that the expanded portion 263b is elastically deformed in a direction in which the expansion amount decreases. As a result, the pedestal portion bottom wall 285a passes the expanded portion 263b and slips out of the expanded portion 263b of the engagement holding portion 263. As a result, the pillar garnish 281 can move until the anchor portion 261b of the tether portion 261 makes contact with the peripheral portion of the tether portion insertion hole 287 of the pedestal portion bottom wall 285a.

At the time of inflation of the CSA 289, if the pillar garnish 281 is pushed toward a vehicle compartment by the expanding CSA 289, the pillar garnish 281 is moved in a direction in which it leaves the body 291 until the anchor portion 261b comes into contact with the peripheral portion of the tether portion insertion hole 287, thereby forming an inflation gap for the CSA 289 between the pillar garnish 281 and the inner panel 291a. If the anchor portion 261b comes into contact with the peripheral portion of the tether portion insertion hole 287 as shown in FIG. 21, the pillar garnish 281 becomes incapable of moving further thereby inhibiting the pillar garnish 281 from being scattered to the vehicle compartment.

[Configuration of Pillar Garnish Mounting Structure]

The pillar garnish 281 is formed of plastic which is as hard as or harder than the clip 211. As shown in FIG. 21, the CSA 289 is expanded and inflated at the time of collision of vehicles, so that the pillar garnish 281 is pushed in a direction in which it leaves the inner panel 291a to form an inflation gap between the inner panel 291a and the garnish main body 283. The CSA 289 is inflated into the vehicle compartment and between an occupant and a side door to restrain and protect the occupant's head. Although at this time, the tether clip 211 allows the pillar garnish 281 to be moved by a predetermined distance through creation of the inflation gap, it restrains movement of the pillar garnish 281 over the predetermined distance to inhibit the pillar garnish from being scattered into the vehicle compartment.

<<Effect>>

Next, an effect of the clip 211 and, if the clip 211 is a tether clip, effects of the tether clip 211 and the pillar garnish mounting structure 201 will be described.

[Effect of Clip]

Figure 19:
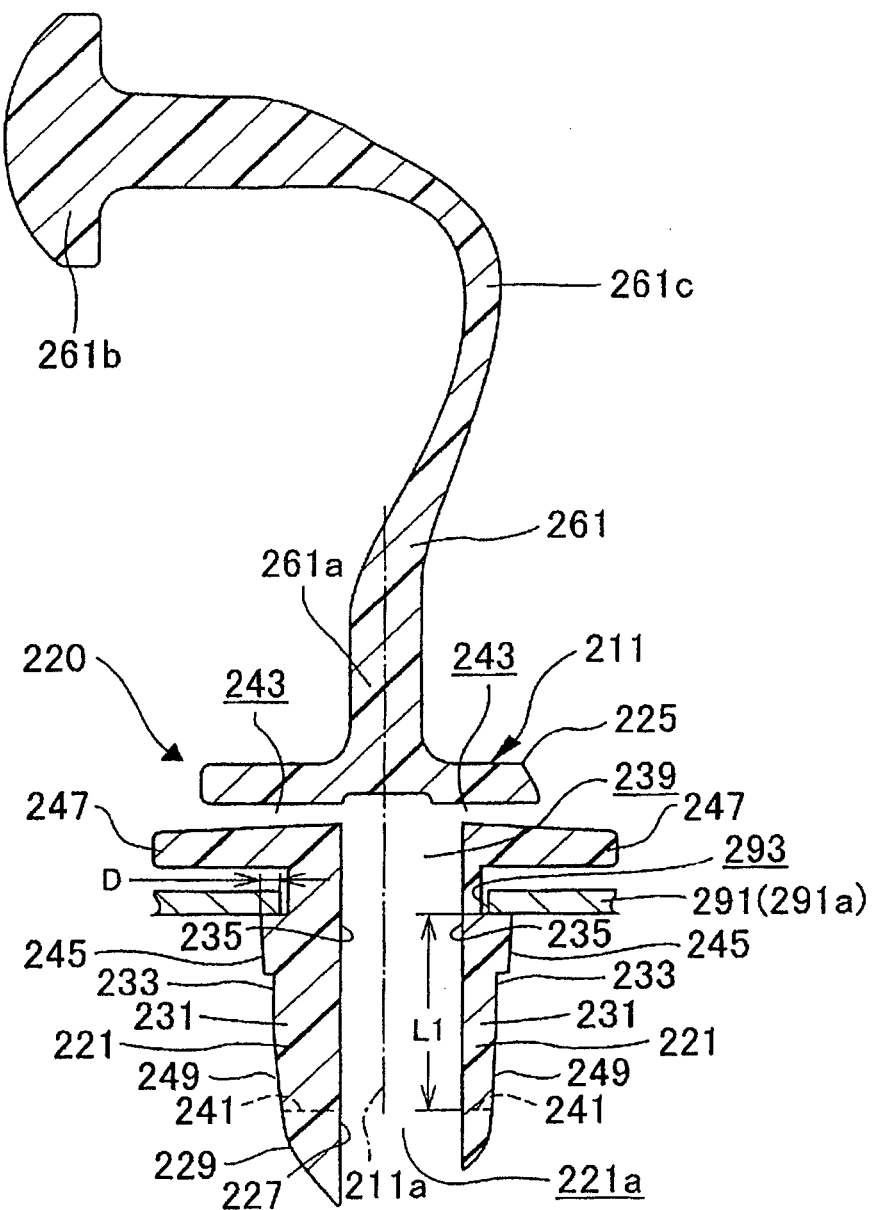
FIG. 19 is an end face view of a section taken along the line XIX-XIX of the clip of FIG. 18.
Figure 25:
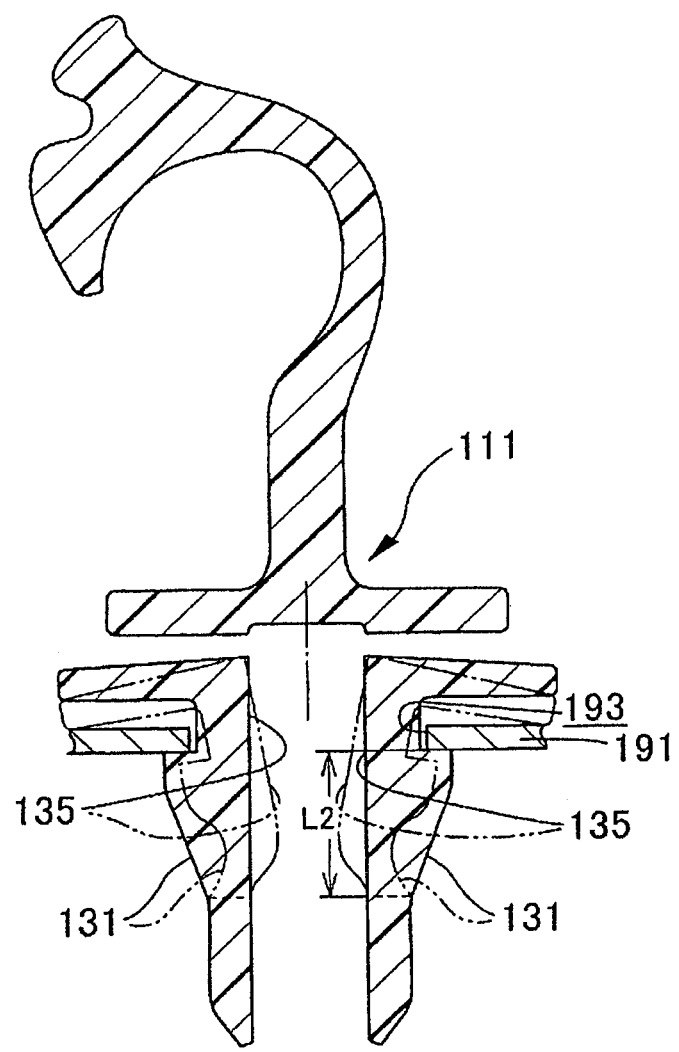
FIG. 25 is an end face view of a section taken along the line XXV-XXV of the clip of FIG. 24.

Because the projection/recess 237 is provided on the internal side face 235 of the locking pawl 231, stiffness in the deflection direction of the locking pawl 231 (opposing direction of the pair of the locking pawls 231) can be secured. Thus, when a load in the clip axial direction is applied to the locking pawls 231 at the time of inflation of the CSA or the like, the locking pawl 231 can maintain its initial (when no load in the clip axial direction is applied to the locking pawl 231) straight posture as shown in FIG. 19. That is, in the locking pawl 231, no deformation of the locking pawl 131 in a comparative clip as indicated with two-dot dash line in FIG. 25 is generated. As a result, when the load in the clip axial direction is applied to the locking pawl 231 at the time of inflation of the CSA or the like, the clip 111 is inhibit from being deflected such that it buckles in the thickness direction at a root portion thereof so that the face opposed to the seating portion of the projecting portion is inclined and slipping out of the peripheral portion of the clip mounting hole 193 of the body 191, like the comparative clip. If the clip 211 slips out of the body 291, the pillar garnish 281 may be scattered into the vehicle compartment. Thus, the clip 211 must be inhibited from slipping out of the body 291.

Because the projection/recess 237 is provided on the internal side face 235 of the locking pawl 231, stiffness of the locking pawl 231 can be secured without any interference of the opposing internal side faces 235. Thus, the engagement allowance D of the locking pawl 231 with the edge portion of the clip mounting hole 293 can be secured without a necessity of increasing the thickness of the locking pawl 231. If stiffness of the locking pawl 231 is secured by increasing the thickness of the locking pawl 231 without provision of the projection/recess 237, interference occurs on the opposing internal side faces when the clip is mounted. For the reason, it is necessary to decrease the engagement allowance of the locking pawl 231 with the edge portion of the clip mounting hole 293. Because according to the present embodiment, stiffness of the locking pawl 231 is secured without increasing the thickness of the locking pawl 231 by providing the projection/recess 237, the engagement allowance D of the locking pawl 231 with the edge portion of the clip mounting hole 293 can be secured. Unless the engagement allowance of the locking pawl 231 with the edge portion of the clip mounting hole 293 is secured, when a load in the clip axial direction is applied to the locking pawl 231 at the time of inflation of the CSA or the like, there is a fear that the locking pawl 231 may slip out or the engaging portion 245 may be chipped out by the edge portion of the clip mounting hole 293. According to the present embodiment, if stiffness is secured by providing the projections/recesses 237, such a disadvantage never occurs.

By providing the projection portion 237a and the recess portion 237b, even if stiffness of the locking pawl 231 is secured, interference of the opposing internal side faces 235 of the pair of the locking pawls 231 can be avoided without an increased thickness of the locking pawls 231. Further, because stiffness of the locking pawl 231 can be secured without increasing the thickness of the locking pawl 231, a length L1 (FIG. 19) from the connecting portion 241 of the locking pawl 231 to the seating portion 225 opposing face of the engaging portion 245 in the clip axial direction can be made longer than the length L2 (FIG. 25) of the comparative clip and thus, a necessary falling deformation angle of the locking pawl 231 when the engaging portion 245 passes through the clip mounting hole 293 can be decreased. As a result, the assembly performance of the clip 211 and the removal easiness of the clip 211 at a service time can be improved compared to the comparative clip 111. Further, because the locking pawl 231 does not have to be formed in a large thickness to raise stiffness, occurrence of sink marks when the clip 211 is formed can be inhibited.

Because the rear face of the inner panel 291a of the body 291 cannot be accessed, if the engagement releasing portion 247 is provided, there is no way but providing the engagement releasing portion 247 at a front end of the locking pawl near the seating portion 225. In this case, the length of the locking pawl 231 is increased by an amount corresponding to the provision of the engagement releasing portion 247, so that when the locking pawl 231 falls down and is deformed, the opposing internal side faces 235 become more likely to interface with each other. However, by provision of the projection/recess 237, the interference of the opposing internal side faces of the pair of the locking pawls 231 can be avoided.

By providing the projection/recess 237 on both the internal faces of the locking pawls 231 and the shank portion 221, bending strength in the deflection direction of the locking pawls 231 is increased. As a result, it is possible to inhibit the removal load resistance of the clip 211 from being reduced due to deflection of the engaging portion 245 accompanied by deformation (deformation as indicated with two-dot dash line in FIG. 25) of the root portion of the locking pawl 231 when removal load in the clip axial direction is applied to the clip 211.

[Effect of Tether Clip and Effect of Pillar Garnish Mounting Structure]

[Effect of Tether Clip]

If the clip 211 is a tether clip, the same effect as or similar effect to the above-described clip can be obtained in the tether clip 21 also. That is, stiffness in the deflection direction of the locking pawls 231 of the tether clip 211 can be secured, the engagement allowance D of the locking pawl 231 with the inner panel 291a can be secured and upon assembly of the tether clip 211 and removal of the tether clip 211 at a service time, the interference of the opposing internal side faces 235 of the pair of the locking pawls 231 can be avoided. As a result, the assembly performance of the tether clip 211, the removal easiness of the tether clip 211 at a service time and removal resistance of the tether clip 211 at the time of inflation of the CSA and the like can be improved.

[Effect of Pillar Garnish Mounting Structure]

The pillar garnish mounting structure 201 can obtain the same effect as or similar effect to the effect of the above-described tether clip 211. As a result, the assembly performance of the pillar garnish 281 to the inner panel 291a is improved, the removal performance of the pillar garnish 281 from the inner panel 291a at a service time is improved and the scattering resistance of the pillar garnish 281 at the time of inflation of the CSA is improved.

What is claimed is:

1. A clip comprising:
    a clip main body, wherein
    the clip main body includes a pair of locking pawls which are deformable in a direction in which they approach each other and a seating portion,
    the pair of the locking pawls have internal side faces opposed to each other, shank portions which are connected to the seating portion and extend in a direction in which they leave the seating portion, pawl portions which are connected to the shank portions and extend in a direction in which they leave the seating portion, and protrusion portions including inclined face which inclined relative to a clip central axial line,
    a projection/recess is provided on at least part of the internal side faces of the pair of the locking pawls, the projection/recess being a comb-like projection/recess that extends along the clip axial direction and has a plurality of projection portion and a plurality of recess portion, the projection/recess extending in the clip axial direction,
    the projection/recess of the locking pawl on one side and the projection/recess of the locking pawl on the other side are shifted with respect to each other such that the projection portion of the projection/recess of the locking pawl on the one side is opposed to the recess portion of the projection/recess of the locking pawl on the other side and the recess portion of the projection/recess of the locking pawl on the one side is opposed to the projection portion of the projection/recess of the locking pawl on the other side, and
    the pair of the locking pawls falls down in a direction in which both of them approach each other, the projection portion of the locking pawl on one side is received by the recess portion of the locking pawl on the other side.

2. The clip according to claim 1, wherein
    the protrusion portions project in a direction in which they leave each other are formed on the pawl portions of the pair of the locking pawls.

3. The clip according to claim 2, wherein
    the protrusion portion is formed over an entire width or substantially entire width of the pawl portion of the locking pawls.

4. The clip according to claim 1 further comprising: a lock pin, wherein
    the lock pin has side faces,
    a space is provided between the internal side faces of the pair of the locking pawls and the lock pin can be inserted into the space, and wherein
    when the lock pin is inserted into the space, a front end face of the projection portion on the internal side face of the pair of the locking pawls contacts the side face of the lock pin to inhibit the pair of the locking pawls from being deformed in a direction in which they approach each other.

5. The clip according to claim 4, wherein
    the projection/recess is formed on at least part of a shank portion and at least part of a pawl portion of the pair of the locking pawls, and wherein
    the projection/recess having the projection portion which rushes in the recess portion formed in the shank portion of the locking pawl, when the lock pin is inserted into the space, is formed at a portion of the lock pin corresponding to the shank portion of the locking pawl.

6. The clip according to claim 4, wherein
    the lock pin has a pin pawl portion,
    the clip main body has a temporary holding hole which receives the pin pawl portion into a wall of a lock pin insertion hole to hold the lock pin temporarily and a final holding hole which receives the pin pawl portion to hold the lock pin finally,
    the final holding hole is provided on a deeper side of the lock pin insertion hole with respect to the temporary holding hole,
    when the pin pawl portion engages with the temporary holding hole, the pair of the locking pawls are deformable in the direction in which they approach each other,
    when the pin pawl portion engages with the final holding hole, the pair of the locking pawls are inhibited from being deformed in the direction in which they approach each other.

7. The clip according to claim 1 further comprising:
    a lock pin that is inserted along a clip axial of the clip main body.

8. The clip according to claim 1, wherein
    the clip main body includes a seating portion and a shank portion which extend in a direction in which they leave the seating portion,
    the pair of the locking pawls extend from a connecting portion with the shank portion to a seating portion side and terminate at a free end.

9. The clip according to claim 8, wherein
    each of the locking pawls projects in a direction in which it leaves a clip central axial line and includes an engaging portion which is capable of engaging with a peripheral portion of the clip mounting hole in a clip axial direction when the clip is mounted on the clip mounting hole and an engagement releasing portion which is provided at a front end of the locking pawl on a side near the seating portion and extends in the direction in which it leaves the clip central axial line.

10. The clip according to claim 9, wherein
    the projection/recess is formed on an opposing internal side faces of the engagement releasing portion provided on the locking pawl.

11. The clip according to claim 8, wherein
    the projection/recess is formed on both the internal side face of the locking pawl and the internal face of the shank portion from the front end of the locking pawl on a side near the seating portion up to a front end of the shank portion on a side far from the seating portion.

12. The clip according to claim 8, wherein
    the clip is a tether clip.

13. A pillar garnish mounting structure in which a pillar garnish is mounted on a body using the clip according to claim 12.

14. A curtain airbag mounting structure in which a curtain airbag is mounted on a vehicle body using the clip according to claim 1.

* * * * *